United States Patent
Hazeltine

(10) Patent No.: US 9,308,510 B2
(45) Date of Patent: Apr. 12, 2016

(54) MONOLITHIC HEAT EXCHANGER AND APPARATUS AND METHODS FOR HYDROGENATION OF A HALOSILANE

(71) Applicant: Bruce Hazeltine, Missoula, MT (US)

(72) Inventor: Bruce Hazeltine, Missoula, MT (US)

( * ) Notice: Subject to any disclaimer, the term of this patent is extended or adjusted under 35 U.S.C. 154(b) by 0 days.

(21) Appl. No.: 14/246,668

(22) Filed: Apr. 7, 2014

(65) Prior Publication Data
US 2014/0334992 A1      Nov. 13, 2014

Related U.S. Application Data

(60) Provisional application No. 61/820,607, filed on May 7, 2013.

(51) Int. Cl.

| | |
|---|---|
| *B01J 12/00* | (2006.01) |
| *F28D 7/10* | (2006.01) |
| *C01B 33/107* | (2006.01) |
| *B01J 19/24* | (2006.01) |
| *F28F 7/02* | (2006.01) |
| *F28F 21/02* | (2006.01) |

(52) U.S. Cl.
CPC ............ *B01J 12/005* (2013.01); *B01J 19/2485* (2013.01); *C01B 33/107* (2013.01); *F28D 7/10* (2013.01); *F28F 7/02* (2013.01); *F28F 21/02* (2013.01); *B01J 2219/2408* (2013.01); *B01J 2219/2409* (2013.01); *B01J 2219/2416* (2013.01); *B01J 2219/2419* (2013.01); *B01J 2219/2433* (2013.01); *F28F 2265/26* (2013.01)

(58) Field of Classification Search
CPC ............... B01J 2219/00135; B01J 2219/2408; B01J 2219/2409; B01J 2219/2416; B01J 2219/2419; B01J 2219/2433; B01J 12/005; B01J 19/244; B01J 19/2485; C01B 33/1071
See application file for complete search history.

(56) References Cited

U.S. PATENT DOCUMENTS

| | | | |
|---|---|---|---|
| 3,963,071 | A | 6/1976 | Levin et al. |
| 4,105,065 | A | 8/1978 | Chirico |
| 4,536,642 | A | 8/1985 | Hamster et al. |
| 5,906,799 | A | 5/1999 | Burgie et al. |
| 7,442,824 | B2 | 10/2008 | Paetzold et al. |
| 7,964,155 | B2 | 6/2011 | Ishii et al. |
| 7,998,428 | B2 | 8/2011 | Ishii et al. |
| 2011/0215084 | A1 | 9/2011 | Miyake et al. |
| 2012/0328503 | A1 | 12/2012 | Fahrenbruck et al. |

FOREIGN PATENT DOCUMENTS

| | | |
|---|---|---|
| CN | 2736729 Y | 10/2005 |
| EP | 0449124 B1 | 5/1995 |
| EP | 2000434 A1 | 12/2008 |
| EP | 2088124 A1 | 8/2009 |
| WO | 2006/081965 | 8/2006 |
| WO | 2010/116440 | 10/2010 |

*Primary Examiner* — Lessanework Seifu
(74) *Attorney, Agent, or Firm* — Jean Kyle

(57) ABSTRACT

A counter current heat exchanger amenable to fabrication from monolithic materials and particularly useful in corrosive and high temperature environments is described. The heat exchanger uses multiple series of holes bored axially through a monolithic material. Axial holes are bored in adjacent flow paths arranged in closely spaced concentric rings. In operation, counter current flow and heat transfer occurs between multiple adjacent axial flow paths. The heat exchanger design is scaleable over a wide range and particularly useful in reactors for the hydrogenation of halosilanes also using cylindrical heating elements. The design enables a small overall reactor size for a given capacity.

15 Claims, 19 Drawing Sheets

MONOLITHIC HEAT EXCHANGER AND APPARATUS AND METHODS FOR HYDROGENATION OF A HALOSILANE

CROSS-REFERENCE TO RELATED APPLICATIONS

This application claims the benefits of U.S. Provisional Application No. 61/820,607 filed May 7, 2013, the disclosure of which is hereby incorporated by reference in its entirety including all figures, tables, and drawings.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

FIELD OF THE INVENTION

This invention relates generally to a heat transfer apparatus made using monolithic materials such as graphite and methods for hydrogenation of a halosilane. More particularly, in certain embodiments, the invention relates to an apparatus and methods for conversion of silicon tetrachloride (STC) to trichlorosilane (TCS).

BACKGROUND OF THE INVENTION

In corrosive and high temperature environments, heat exchangers made of monolithic materials such as graphite are routinely used in the chemical industry. Similar designs using other ceramic materials are also used, though less frequently due to cost and size limitations. In small heat exchangers, the entire unit may be one block of solid material with holes bored through in cross flow patterns known to those in the industry. Larger heat exchangers are usually assembled from multiple blocks where at least one of the fluids makes multiple passes in a zig-zag pattern flowing at substantially right angles to the other flow allocation. The second flow allocation can be a series of passes, or straight through the long axis of a heat exchanger. In most cases, the multiple block designs are due to size limitations of the starting monolithic materials.

Heat transfer is most efficient and cost effective when countercurrent flow can be employed in compact designs keeping opposing flow channels as close to each other as reasonably possible. Cross flow rather than counter current flow represents the current state-of-the-art in virtually all commercial scale heat exchangers made of monolithic materials. In the majority of existing cross flow designs, external containment made of multiple metallic components is used to route the fluid allocated to at least one side of the heat exchanger through its multiple passes. These designs are mature and work well when the cross flow fluid is not particularly corrosive (i.e. such as cooling water, refrigerant, or steam) or at temperature extremes. In heat exchangers with many cross flow channels and large temperature differences between the fluid allocations, the cross flow design can approach the thermal performance of a counter current design when substantially cubic blocks are used.

In processes where both fluids are corrosive, or at high temperature such that metallic components cannot be exposed to either fluid, and when for fabrication or process reasons such as high pressure it is desirable to use assemblies of substantially cylindrical blocks rather than substantially cubic or rectangular blocks, there is a long sought and unresolved need for a better design.

Chemical vapor deposition (CVD) reactors are used to produce polycrystalline silicon (polysilicon), the key raw material used in the manufacture of most semiconductor devices and silicon-based solar wafers and cells. The most widely used method for producing polysilicon is the Siemens reactor process, which has been in existence for about fifty years. In this process, high temperature polysilicon rods are placed in a reactor, and trichlorosilane (TCS) gas is passed over these rods. The silicon in the gas is deposited on the rods, and when the rods have grown large enough, they are removed from the reactor. The end product is in the form of polysilicon rods or chunks, which can be further processed into ingots, then sliced into wafers that are made into solar cells, for example. In a related process, TCS is disproportionated to form silane ($SiH_4$) and STC. The silane produced is used in many processes associated with semiconductors and other products, including making polysilicon in either a Siemens reactor or fluidized bed CVD process. The fluidized bed process makes silicon in irregular, but nominally spherical beads in diameters typically ranging up to about 2 mm diameter.

The process converting TCS into silane and the CVD-based Siemens process for manufacturing polysilicon both produce a large amount of the byproduct silicon tetrachloride (STC). For example, a maximum of about 20 kg of STC is made as a byproduct for every kg of polysilicon or silane produced. It is possible, however, to hydrogenate STC forming TCS by reacting STC with hydrogen in the gas phase at high temperature. The product TCS can then be recycled to a series of silane disproportionation reactors and separation steps to make silane, or to a CVD reactor for direct production of more polysilicon. If STC could not be recycled, there would be a huge loss of the primary raw materials silicon and chlorine and a cost for disposal of the byproduct STC.

To efficiently react STC with hydrogen to form TCS, high reactant gas temperatures (e.g., greater than 850° C.) are required. Current commercially available systems sold for conversion of STC to TCS use retrofitted Siemens style CVD reactors with electrically heated graphite rods to heat the reactant gases. This equipment has a number of problems. For example, because CVD reactors have a high volume to heated rod surface area ratio, the local velocities and the heat transfer coefficients in the reactor are low. Thus, very high rod surface temperatures are required (e.g., temperatures greater than 1400° C.) to heat the reactant gas to sufficient temperature. Furthermore, the retrofitted CVD reactors have a large, heavy baseplate, that is expensive and makes it inconvenient to add heat exchanger equipment for recovery of heat.

Moreover, the heated graphite rods in a retrofitted CVD reactor require a large number of electrical connections. For example, the reactor may require up to 24 U shaped heater rods with up to eight electrical connections per hairpin. Every connection is a potential source of rod failure. Every baseplate penetration represents risks for electrical ground faults.

Furthermore, CVD reactors have a high radiation heat loss to the shell, wasting large amounts of energy. Insulating materials can be installed inside a Siemens style hydrogenation reactor. Such insulation must be installed around the outer perimeter of the heating rods requiring a substantial quantity of material. The insulation itself will heat nearly to the temperature of the heating rods requiring use of expensive materials in order to achieve long life. Cheaper insulating materials do not exhibit an adequate lifetime due to reaction with reactant gases at the high temperatures involved. As a result of the size and expensive nature of the materials needed, insulation on a Siemens style hydrogenation reactor is very expensive. Some Siemens style hydrogenation reactors feature a primitive heat exchanger for heat recovery. With the use of insulation and a primitive heat exchanger, a retrofitted CVD reactor for conversion of STC to TCS requires energy of at least 1.5 Kwhr per kilogram of TCS manufactured, which is quite high. With no heat exchanger at all, a retrofitted CVD reactor requires up to 3.5 Kwhr/per kilogram TCS produced or even slightly more if the thermal losses are great. Key components of the hydrogenation reactor have limited lifetimes and must be replaced at regular intervals—including the heating elements, the electrical connections, the insulation, and components of the heat exchanger.

Purpose-built (non-retrofitted) systems for conversion of STC to TCS have been proposed and are the subject of patents by Mitsubishi, Wacker, and Hemlock Semiconductor, which promise to be more energy efficient and cheaper to build than retrofitted CVD reactors (see, for example, U.S. Pat. Nos. 5,906,799 and 7,998,428; U.S. Patent Application Publication 2011/0215084; International Publication Nos. WO/2006/081965 and WO/2010/116440; and European Patent Application Publication Nos. 2 000 434 A1 and 2 088 124 A1). However, such purpose-built systems are not widely used, and are not yet commercially available. U.S. Pat. No. 7,442,824 describes a purpose-built STC to TCS hydrogenation reactor with heating elements and a reactor wall that are coated with silicon carbide (SiC) to prevent contamination and degradation of these components in high temperature reaction environments. The hydrogenation reactor employs graphite heating rods, as used in retrofitted CVD reactors creating numerous connection points for potential electrical and mechanical failure. U.S. Pat. No. 7,964,155 shows a substantially different approach to an STC hydrogenation reactor where gas flows from outside diameter to inside diameter through a series of concentric cylindrical baffles forming a heat exchanger with a heating element surrounded by the heat exchanger. This design appears challenging to fabricate and limited in scalability and heat transfer efficiency as the gas must flow from a large to a small diameter.

Thus, there is a need for a more efficient STC to TCS hydrogenation reactor suitable and available for commercial use.

All patents, patent applications, provisional patent applications and publications referred to or cited herein, are incorporated by reference in their entirety to the extent they are not inconsistent with the teachings of the specification.

SUMMARY OF THE INVENTION

The present invention provides a countercurrent design for cylindrical heat exchangers made of monolithic materials providing substantial advantages over the designs presently in use. The design is fully counter-current, compact, and scaleable to any size of graphite commercially available at this time. It makes it unnecessary to contact either fluid allocation with materials other than the material (e.g. graphite) the blocks are made of and gasket materials except at one fluid entry and exit point. Suitable gasket materials can be identified for most applications by those skilled in the art. This design is advantageous in any of the conditions described above and particularly advantageous in reactors designed to hydrogenate STC to make TCS.

In one aspect, the invention relates to an apparatus for enabling countercurrent heat transfer with heat transfer equipment (or heat exchangers) made of monolithic materials such as graphite. In this heat exchanger design, it is not necessary to contact either fluid with anything other than graphite and a gasket material except at one entrance and exit for each fluid from the heat exchanger. This is accomplished by using a header block mounted at each end of blocks of monolithic materials enabling adjacent countercurrent flows in closely spaced channels within blocks of any size commercially available. In another aspect, it relates to the hydrogenation of a chlorosilane and apparatus to accomplish this hydrogenation which is specifically benefitted by the aforementioned heat exchanger design. The apparatus includes (i) a counter current heat exchanger configured to exchange heat between a reactant gas and a product gas, wherein the reactant gas includes hydrogen and a chlorosilane; (ii) a cylindrical heating zone configured to receive the reactant gas from the heat exchanger, the heating zone including a heating element configured for direct contact with the reactant gas to produce a heated reactant gas via convective heat transfer; and (iii) a reaction chamber surrounding the heating zone configured to convert the heated reactant gas into the product gas, wherein the heating element has a cylindrical conformation within the heating chamber and wherein the heating element is configured to minimize the number of electrical connections. The heating element could be configured with two electrical connections for direct current (DC) or single phase alternating current (AC), or with 3 electrical connections for typical 3 phase industrial AC electrical supplies.

Alternatively, the heating element can be isolated from the process gas by being located inside a susceptor that is flooded with an inert gas, the overall configuration of the design making this particularly easy to accomplish.

In another aspect, the invention relates to a method for hydrogenation of a chlorosilane. The method includes the steps of: (i) introducing a reactant gas into a reactor including a heat exchanger, a substantially cylindrical heating zone, a heating element, and a reaction chamber, wherein the reactant gas includes hydrogen and a chlorosilane; (ii) directing the reactant gas through the heat exchanger to exchange heat between the reactant gas and a product gas, thereby preheating the reactant gas; (iii) directing the preheated reactant gas from the heat exchanger into the substantially cylindrical heating zone including the heating element, wherein the preheated reactant gas comes into direct contact with a surface of the heating element, and wherein the heating element is configured to minimize the number of electrical connections; (iv) directing the heated reactant gas from the substantially cylindrical heating zone into the reaction chamber, wherein the heating element has an cylindrical conformation inside or at one end of the reaction chamber; and (v) converting the heated reactant gas into the product gas within the reaction chamber and/or heating zone.

In another aspect, the invention relates to a heating element for use in a reactor for hydrogenation of a chlorosilane. The heating element includes a tube having slots defining a serpentine electrical path, wherein the slots create an electrical path having suitable resistance, cross section, and surface area to achieve the desired surface temperatures while also working with electrical voltages and currents most economically used in the industrial setting where this reactor may reside.

The chemistry exercised in one embodiment of the reactor is as follows:

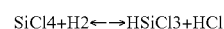

In order to achieve desirable equilibrium, it is necessary to heat the reactant gases above about 800-850° C. and preferably above 900° C. Thermodynamics predicts conversion around 20% at this temperature and conversion up to as much as 28% at higher temperatures. In commercial practice, the reverse reaction has prevented recoverable conversion above about 20%. It is essential that the product gas be rapidly cooled to minimize the reverse reaction and maximize recoverable conversion.

BRIEF DESCRIPTION OF THE SEVERAL VIEWS OF THE DRAWING

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
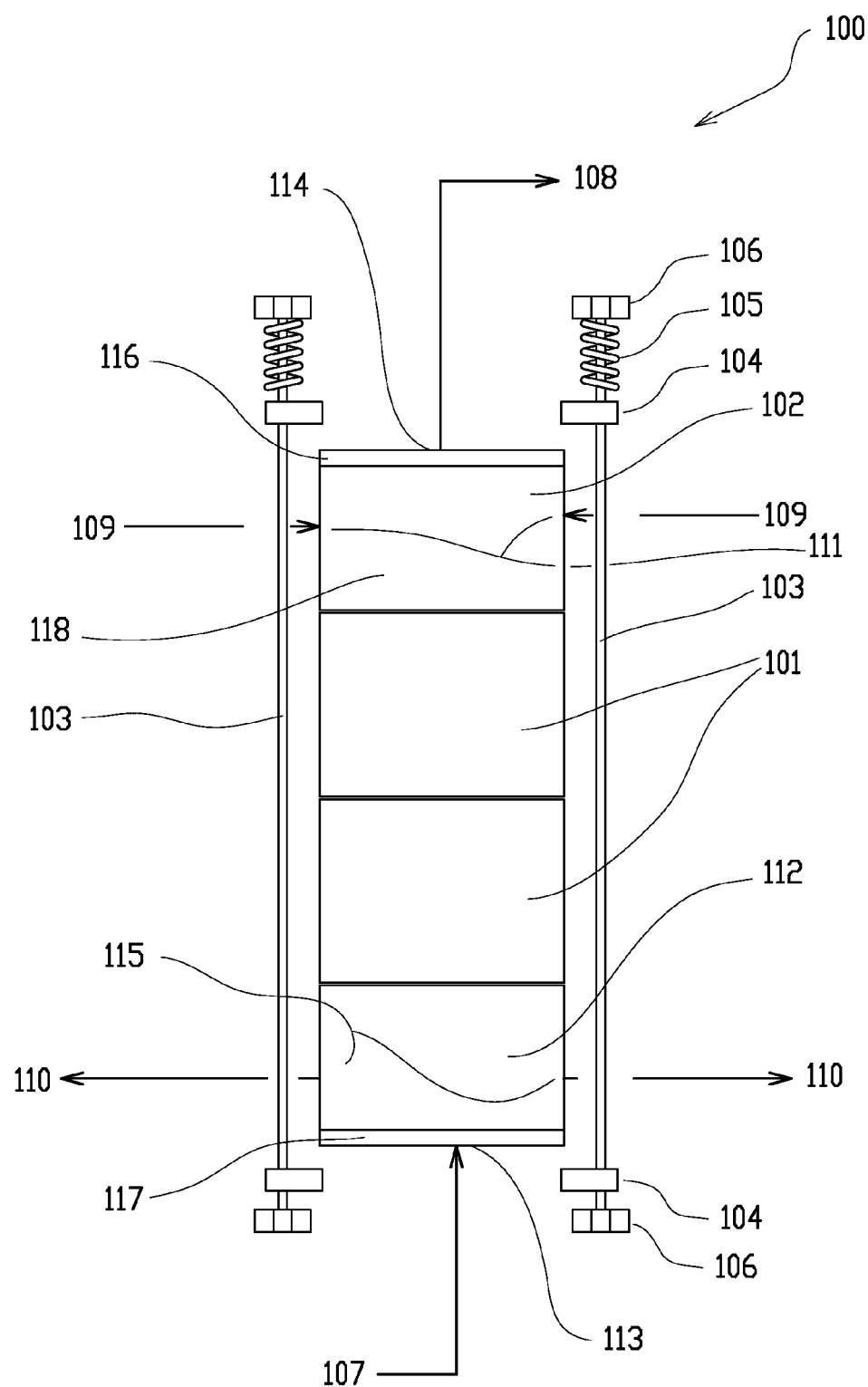
FIG. 1 is a schematic view of a heat exchanger assembly of monolithic materials with heat exchanger blocks in the center and header blocks at each end, according to an illustrative embodiment of the invention.

Throughout the description, where apparatus, compositions, mixtures, and composites are described as having, including, or comprising specific components, or where processes and methods are described as having, including, or comprising specific steps, it is contemplated that, additionally, there are compositions, mixtures, and composites of the present invention that consist essentially of, or consist of, the recited components, and that there are processes and methods of the present invention that consist essentially of, or consist of, the recited processing steps.

It should be understood that the order of steps or order for performing certain actions is immaterial so long as the invention remains operable. Moreover, two or more steps or actions may be conducted simultaneously.

It is contemplated that methods, systems, and processes of the claimed invention encompass scale-ups, variations, and adaptations developed using information from the embodiments described herein. Methods and processes described herein may be conducted in semi-continuous, and/or continuous operation. Reactors may be single-stage or multi-stage. It is contemplated that methods of the invention may be combined or supplemented with reactors, systems, or processes that are known in the art such as fluidized bed reactor (FBR) processes used to make TCS from hydrogen chloride (HCl) and metallurgical grade silicon, or FBR processes to make TCS from hydrogen, STC and metallurgical grade silicon. Known, suitable techniques for separation of reaction products, recirculation of reactants, isolation and purification of reaction products, etc. may be adapted for application in various embodiments of the claimed invention.

The mention herein of any publication, for example, in the Background section, is not an admission that the publication serves as prior art with respect to any of the claims presented herein. The Background section is presented for purposes of clarity and is not meant as a description of prior art with respect to any claim.

As used herein, a "halosilane" is understood to be a compound of the general formula $R_nSiZ_{4-n}$, where the radicals R are identical or different and are each hydrogen or an organic radical, such as an alkyl group $C_nH_{2n+1}$, and n is 0, 1, 2 or 3. Z is a halogen from the group Fluorine, Chlorine, Bromine, Iodine. When Z is chlorine (Cl), the halosilane is a chlorosilane. For example, in one embodiment the radicals R are —H, —CH$_3$, or a combination thereof. In certain embodiments, each R is —H. In certain embodiments, the integer n is 0, 1 or 2. In certain embodiments, n is 0. In preferred embodiments, the halosilane is tetrachlorosilane (silicon tetrachloride, STC). In other embodiments, the halosilane is a bromosilanes, chlorodisilane or methyltrichlorosilane. Anywhere a chlorosilane is referred to, other halosilanes are considered equivalent. i.e. bromosilanes, fluorosilanes, or iodsilanes.

As used herein, cylindrical heater is understood to mean a 3 dimensional heating element having a circular, elliptical, or other polygonal cross section of finite length and with or without a solid circular, elliptical, or polygonal shape within the inside perimeter of the cylindrical heater. Possibly, shapes consuming relatively minor cross sectional area can be inserted inside the heating element to stiffen it. For example, a circular heating element within a circular chamber where there is or is not a solid cylindrical shape preventing fluid flow anywhere within the area of the heating zone interior to the heating element is a circular heater.

As used herein, an open heater or open heating element refers to one where process gas flows directly over the heating element. A closed heating element or closed heating design refers to a design using a susceptor where the heating element is not exposed to the flowing gas.

As used herein, countercurrent is understood to mean flows in opposite directions such that a hot fluid might enter one end of a heat exchanger flowing one direction while a cold fluid enters the opposite end of the heat exchanger and flows directly opposite the direction of the hot fluid. There is no reversal of flow direction within the zone designed primarily for heat transfer. The distinct hot and cold fluids present in a heat exchanger are referred to as the fluid allocations. (e.g. The hot and cold fluid allocations, or collectively as the fluid allocations).

As used herein, cross flow is understood to mean flows at an angle substantially different than 180 degrees to each other. For example, flows at 90 degrees to each other is common in monolithic heat exchangers of current design. Traditional terminology for cross flow heat exchangers having a substantially square cross section is to call one flow direction longitudinal and the other transverse. Longitudinal flow is typically made in a single pass and is unidirectional through a heat exchanger, but could be of a multi-pass design. Transverse flow can make one or more passes in cross flow to longitudinal flow and monolithic blocks are routinely stacked end to end to make a larger heat exchanger such that there are many transverse flow passes and one longitudinal pass. By making many transverse passes, overall countercurrent effects are approximated. In order to make multiple passes, cover plates and baffles must be attached outside the blocks of monolithic materials requiring many seals and adding cost, complexity, and reliability concerns to the finished heat exchanger assembly.

In cross flow heat exchangers with a substantially round cross section, flow is typically referred to as axial and radial. In this case, axial flow is analogous to longitudinal flow in a square design. Radial flow is from a channel on the outside diameter to a channel on the inside diameter of a monolithic block and back to the outside diameter and its channel. Containment of the channel at the outside diameter of the block must be suitable for the fluids at flowing conditions. Baffling to accomplish the desired flow path must be installed, again adding substantially to cost and complexity of the heat exchanger. This is especially true when the fluid in cross flow is corrosive to relatively inexpensive metallic components, or too high of a temperature for plastic, polymeric, or elastomeric materials (e.g. PTFE, natural or synthetic rubbers, VITON® or KAL-REZz®) that might be used as structural members and/or to coat metallic components. In the case of round heat exchangers with radial and axial flow, the spacing between the radial flow channels increases as one moves from the inside to outside diameter of the heat exchanger (as does the distance between spokes in a wheel as one is closer to the rim than the hub) resulting in inefficient use of the monolithic material. Also, the channel created at the inside diameter of the round block creates another loss of material and creates space unusable, or at best, highly inefficient for heat transfer. In the case where corrosive fluids and/or temperatures are such that only monolithic materials can be used to form the flow channel and baffles on the outside diameter of a heat exchanger, the problems and costs encountered to form the baffles are substantial and truly fluid tight baffling is seldom achieved. This problem is greatly exaggerated by differential thermal expansion between the central block and outer channel used to form the heat exchanger assembly where only rigid materials can be used in the environment. Substantial undesirable fluid leakage or bypassing of the desired flow path often occurs. Where internal pressures are substantial, and/or diameters large, the outer shell must be made to withstand the mechanical stresses resulting in fairly thick structures when commonly used materials such as graphite are used. At best, forming the outer channel is costly as it must be made the same monolithic materials used for the heat exchanger blocks. At worst, it leaks and seriously degrades performance and/or reliability.

Heat exchangers made with round cross sections can also be made with transverse channels parallel to each other and perpendicular to the axial flow path. This makes efficient use of the monolithic block for heat transfer area, but makes the flow path on some transverse paths much shorter than others resulting in mal-distribution of fluid flow and less efficient heat transfer. This design has similar problems to the axial/radial flow patter as regards baffling on the external channel.

As provided herein, a newly designed counter current heat exchanger using monolithic materials addresses problems associated with traditional cross flow heat exchangers traditionally made with monolithic materials. A design for a header block installed at each end of the heat exchanger enables counter current flow in adjacent concentric rings of holes bored axially through a monolithic heat exchanger. By making the heat exchanger counter current, temperature difference between the two sides is maximized resulting in minimized surface area required for a given amount of heat transfer. Minimizing the area required also minimizes the quantity of materials used thus minimizing cost. Within the heat exchanger, very efficient use of volume is achieved as no channels are required for flow reversals or fluid headers. The problems of inefficient use of volume with radial flow paths is completely avoided. Mal-distribution of fluid flow within the heat exchanger blocks is minimized as all flow paths create substantially the same path length and resistance to flow from both frictional and acceleration effects. The only seals required between the flow allocations are O-ring or flat circular gaskets or other sealing methods known to those skilled in the art between the adjacent flow channels where heat transfer blocks are butted against each other and where header blocks are butted against heat exchanger blocks. When handling high temperature fluids where no metallic, plastic or elastomeric materials can be used, especially for baffles in the radial or transverse flow, this design is especially superior to other designs.

Another aspect of the current invention is that it enables a heat exchanger to be made of monolithic materials without a steel shell or similar containment on the outside diameter of the device. Other than monolithic materials, only hold down rings and endcaps are required in many applications and these are not bulky or costly items. If secondary containment is desired, it can be accomplished by the addition of a metallic vessel or other methods known to those skilled in the art. High pressures inside the heat exchanger are relatively easy to contain anytime adequate clamping force can be applied to accomplish gasket sealing.

In the case of graphite and ceramic heat exchangers one limitation on the capacity is the size of blocks used as starting materials that can be economically produced. By making the best use of material, the greatest capacity within a given size of monolithic block is afforded. In this aspect, for cylindrical heat exchangers, this design is a substantial improvement over other designs known to exist. It is also plausibly the lowest cost for materials in cylindrical designs. Machining practices to create a block of this invention are known and routine to those skilled in the art.

In all heat exchangers, there is an inevitable trade-off between pressure drop of the flowing fluids and heat transfer coefficient. The velocity and directional changes associated with flow reversals and fluid acceleration or deceleration flowing from bored holes into the flow channel and vice-versa in the radial flow or transverse flow create substantially more pressure drop than is required to achieve a similar heat transfer coefficient in the axial or longitudinal flow path. This heat exchanger design greatly reduces the differential pressure necessary to give a similar heat transfer coefficient for the fluid allocation that would otherwise be in cross flow since it now flows through a continuous cylindrical flow path (e.g. a hole bored through the heat exchanger from end to end) except at one flow header at each end of the heat exchanger. Alternatively, the same pressure drop used in a cross flow heat exchanger can be used and the heat transfer coefficient will be greater allowing for a smaller and less costly heat exchanger and less fluid residence time. In the case of an interchanger where substantially the same flow stream is flowing through the heat exchanger in opposite directions (an interchanger), the same allowable pressure drop translates into a higher heat transfer coefficient and hence a smaller heat exchanger for the same thermal performance.

This heat exchanger design is useful in many applications, and is particularly advantageous in the high temperature hydrogenation of STC to TCS. It is highly advantageous in this application for several reasons:

1) It eliminates the problems associated with forming the high temperature baffles needed for the cross flow style heat exchanger. A heat exchanger eliminating undesirable fluid leaks or bypassing is much more easily and reliably accomplished.

2) Product gas can be cooled faster while still keeping pressure drop smaller thus reducing the extent of reverse reaction and maximizing conversion for a given reaction zone temperature.

3) The quantity of material used in the heat exchanger and its surface area for equivalent thermal performance is reduced, thus reducing the cost and surface area available to contaminate the product. Alternatively, it enables a larger capacity hydrogenation reactor to be made at the same cost affording economies of scale on the hydrogenation reactor itself as well as total installed cost. Since there is a finite size limit of commercially available starting materials, the more efficient design simply allows a higher capacity device.

4) It is normally necessary to coat the surface of graphite heat exchangers with silicon carbide (SiC) or similar materials using a CVD process. This process is costly so reducing the surface area requiring coating again reduces costs. In addition to this, coating complicated cross flow patterns are more costly to coat as it is difficult to force the CVD gas through both transverse and longitudinal flow paths at the same time in an SIC CVD coating process.

5) Circular heat exchangers with axial/radial flow are typical in STC hydrogenation reactors. When this is done a separate cylindrical shell, also made of graphite or carbon-carbon (CC) materials is necessary to form the channel and baffles on the outside diameter of the heat exchanger. Since this shell forming the channel is always at a different temperature than the heat exchanger block, differential thermal expansion must be accommodated making design of the baffle seals particularly challenging. With the countercurrent design described here, no such shell and baffles are required. This substantially reduces graphite material usage and fluid leakage or bypassing.

6) In the typical axial/radial flow cylindrical heat exchanger where the outer shell forming the flow channel for the axial passes must be made of graphite, the graphite on the shell must be made to withstand the maximum pressure difference that can exist. When the diameter of the heat exchanger becomes large, the wall thickness required to contain the differential pressure is significant and/or the allowable pressure drop in the heat exchanger is small. In the counter current design described herein, there is no large unsupported span of graphite forming a pressure boundary within the heat exchanger blocks. The exterior wall of the heat exchanger block can be quite thin, typically less than 12 mm and dictated by issues other than internal pressure. The net result is another savings of expensive monolithic materials.

7) Since the reversible reaction must be rapidly cooled, it is a practical necessity to have the exhaust gas flow through the axial flow path of a cross flow heat exchanger. This heat exchanger design greatly facilitates a reactor design where the heating zone can be placed at the radial center of the reactor and at one axial end while easily accomplishing reversal of the gas flow after it is heated and routing it back to the heat exchanger. It is advantageous to place the heating element at one end of the reactor to make access as easy as possible.

8) The cold end heat exchanger header, being at a temperature and having composition that it can be made of low cost metallic construction solves any problems that might occur in some processes where high differential pressure between the fluid allocations creates strength concerns for a header block made of materials such as graphite.

As provided herein, a newly designed STC to TCS hydrogenation reactor addresses the problems of retrofitted Siemens style CVD reactors and of the heat exchanger such as that described in U.S. Patent Application Publication US2012/0328503 A1. The new hydrogenation reactor features a highly efficient heat exchanger having minimal gas residence time on the product gas side and a circular heating zone contained at the radial center and axial end of the hydrogenation reactor. After leaving the heating zone, gas flows around the heating zone and back into the interchanger where it heats the feed gas. In addition to the advantages over Siemens style hydrogenation reactors, this design also has significant advantages over other designs referenced by patents previously cited in simplicity, ease of fabrication, maintenance, capacity, and cost.

The reactant gas includes hydrogen and a halosilane (e.g., STC), which reacts in the cylindrical heating zone and/or reaction chamber to form a product gas (e.g., TCS).

In comparison with previous systems having an open heater where velocity over heating elements is extremely slow (as in a repurposed Siemens reactor style hydrogenation reactor), or quite high as in U.S. Patent Application Publication US2012/0328503 A1, the velocities in the heating zone when used with an open heating element (ie. no susceptor) in this circular design are intermediate. At very slow velocities, silicon deposition is often observed. At very high velocities, additional costs are incurred to stiffen the heating element and prevent damage. Within the general design of this hydrogenation reactor, it is possible, within a wide range, to manipulate the surface area and cross sectional area in the heating zone to maintain temperature that is learned to optimize performance. In any case, the open heating element is designed to operate between 1000° C. and 1500° C. The heating zone is the hottest place within a hydrogenation reactor. By placing it at the radial center of the reactor and routing the gas around it on its path back to the interchanger, the thermal insulation between the heating zone and the pressure vessel is protected from the highest temperatures thus reducing energy losses and/or enabling the use of less thermal insulation than designs that have the heating elements closer to the perimeter and/or radiating on internal parts ultimately exposed to the vessel wall.

Residence times are much lower in this hydrogenation reactor than in retrofitted Siemens style CVD hydrogenation reactors—e.g., 0.3 seconds or less versus 4 seconds. Thus, the reactor may be made smaller while allowing the same production rate, thereby lowering the capital cost of the equipment and replacement cost of parts. The chemical kinetics at the temperatures employed are sufficiently high that minimal residence time is required to accomplish the desired reaction. By using a cylindrical heating zone, the overall diameter of a reactor can be reduced versus the annular heating design of U.S. Patent Application Publication US2012/0328503 A1, thus reducing the quantity of materials used and hence cost and energy losses. By attaching the heating element to one axial end of the reactor it makes for the easiest possible maintenance access. Inert coatings, such as SiC coatings, are preferably used on surfaces of the reactor that come into contact with hot gas. Because these coatings are expensive, the reduced surface area requiring these coatings results in a significant cost savings.

Compared to a Siemens style hydrogenation reactor, the design of a circular heating element within the cylindrical heating zone of this invention permits' the use of significantly fewer electrical connections (e.g., as few as two or three electrodes versus previous Siemens systems with 24-48 electrode penetrations), thereby simplifying the construction and greatly reducing the electrical ground fault problems and problems inherent in electrical connections of retrofitted CVD reactors and previous purpose-built hydrogenation reactors. The cost of many electrodes is eliminated. Furthermore, there is no heavy, bulky baseplate used in the new hydrogenation reactor, unlike retrofitted CVD reactors. Compared to an annular heating element, this heating element is smaller and easier to replace.

In one aspect, the invention relates to an apparatus for hydrogenation of a chlorosilane. The apparatus includes (i) a heat exchanger configured to exchange heat between a reactant gas and a product gas, wherein the reactant gas comprises hydrogen and a chlorosilane; (ii) a cylindrical heating zone configured to receive the reactant gas from the heat exchanger, the heating zone comprising a heating element configured for direct contact with the reactant gas to produce a heated reactant gas via convective heat transfer; and (iii) a reaction chamber configured to convert the heated reactant gas. In one embodiment, the chlorosilane comprises silicon tetrachloride (STC) and the product gas comprises trichlorosilane (TCS).

In certain embodiments, the apparatus includes a vessel housing the heat exchanger, the cylindrical heating zone, and the reaction chamber. In one embodiment, the apparatus includes (i) insulation between the reaction zone and a wall of the vessel, and/or (ii) insulation between the heat exchanger and the wall of the vessel. The reaction chamber may be an annular space surrounding the heating chamber, and/or axially displaced from the heating chamber, or both.

In another embodiment, the heating zone may lie within the reaction chamber and be indistinguishable from a reaction chamber. The flow path from the heating zone to the interchanger can be only as large as is required for flow passage with acceptable pressure drop. In this scenario, a heretofore unrecognized advantage exists for the use of several concentric heating elements. A hydrogenation reactor of substantial capacity can be made quite small. Given the relatively high efficiency of a heat exchanger of the design described herein, the incremental energy cost of operating at higher temperature to affect a faster reaction and minimize the volume of the high temperature zone represents a combination of benefits previously unrecognized.

In certain embodiments, the heat exchanger includes a plurality of heat exchanger blocks. Each block may be coated with silicon carbide (SiC), zirconium carbide (ZrC), hafnium carbide (HfC), tantalum carbide (TaC), titanium carbide (TiC), niobium carbide (NbC), hafnium oxide ($HfO_2$), silicon oxide ($SiO_2$), zirconium oxide ($ZrO_2$), tantalum oxide ($Ta_2O_5$), yttrium oxide ($Y_2O_3$), titanium oxide ($TiO_2$), and/or aluminum oxide ($Al_2O_3$).

In one embodiment, each of the heat exchanger blocks includes a plurality of bored passageways aligned in concentric circles in the axial direction where fluids flow in adjacent rings in opposite directions In one embodiment, the heat exchanger blocks are held in place and force sufficient to seal gasketted joints provided with a spring loaded hold-down ring. The hold-down ring is anchored against the containment vessel near its outer diameter and a collar on an upper heat exchange block near its inside diameter. The hold-down assembly is configured such that metallic springs used to accommodate differential thermal growth between the pressure vessel and the monolithic materials inside it are located in a cool zone allowing the use of relatively low cost springs. In another embodiment, the heat exchanger blocks are held in place with a spring loaded cylindrical beam pressing down on the heat exchanger blocks from above. This beam would also be spring loaded and press against the containment vessel to balance the reaction force.

In certain embodiments, the reaction chamber has a height between about 0.35 meters and about 4 meters. The reaction chamber may have a diameter between about 0.15 meters and about 1.5 meter and an annular flow path of between 30 mm and 500 mm. There may be no reaction zone distinguishable from the heating zone, (i.e. the gas flows in the most direct path possible from the heating zone to the heat exchanger). In one embodiment, the heat exchanger and/or the heating element each include composition of a carbon/carbon composite and graphite. The heating element may be configured to be removable. In another embodiment, the heating element includes no more than three electrodes.

In certain embodiments, the heating element includes a plurality of slots (e.g., circumferential slots) defining a serpentine path, and may further include stiffening elements. The stiffening elements may work by preventing movement of various parts of the heating element relative to each other and/or by intentionally deflecting the heating element from its relaxed state, thus requiring further deflection to require force greater than is required from the relaxed state. The stiffening element may include silicon nitride, alumina, quartz, boron nitride, or mixtures thereof. If configured such that it can be electrically conductive, the stiffening element can be made of graphite or carbon/carbon materials that may be coated as previously described for other parts.

In another aspect, the invention relates to a heating element for use in a reactor for hydrogenation of a chlorosilane. The heating element includes a tube having slots defining a serpentine electrical path, The tube may include a electrical floating neutral, which may include a continuous ring of tube material.

In certain embodiments, a cross-section of the tube is substantially circular, polygonal, or elliptical. In one embodiment, the plurality of axial slots divide the tube into a plurality of angular sections. For example, the tube may include three axial slots dividing the tube into three angular sections.

In one embodiment, the tube includes a plurality of circumferential slots. In another embodiment, the circumferential slots include connected slots and disconnected slots, wherein (i) each of the connected slots are connected to one of the axial slots, and (ii) each of the disconnected slots are not connected to any of the axial slots. Within each angular section, the connected slots may be arranged in pairs, with the connected slots in each pair approaching one another at a midsection of the angular section. The disconnected slots may be substantially centered within the angular section, thereby forming the serpentine electrical path. In certain embodiments, the connected slots and disconnected slots are arranged in an alternating pattern along an axial direction of the tube. For each angular section between two axial slots, two or more serpentine electrical paths may be defined such that each serpentine path winds back and forth between an axial slot on one side of the angular section and the midsection, as electrical current travels from one axial end of the tube to an opposite axial end.

FIG. 1 is a schematic view of a countercurrent heat exchanger 100, according to an illustrative embodiment of the invention. The heat exchanger includes heat exchanger blocks 101, header blocks 102 and 112, endcaps 116 and 117, tie-rods 103, hold down rings 104 compression springs 105 and nuts 106. Tie-rods 103 and hold down rings 104 hold the endcaps 116, 117, header blocks 102, 112, and heat exchanger blocks 101 together. Springs 105 accommodate differential thermal expansion between the tie-rods 103, and the parts they hold together. Nuts 106 are used to apply the desired tension to the tie-rods 103.

In operation, fluid stream 107 flows into endcap 117 at port 113 and then into header 112. Fluid stream 109 flows into header block 102 at ports 111 and the same fluid, having been heated or cooled by stream 107, flows out the opposite end (streams 110) at ports 115. Stream 108 is the outlet for inlet stream 107. The header blocks channel the flow's 107 and 109 into alternate concentric rings within the heat exchanger blocks. It should be understood that different header configurations are possible that enable flow through alternate ports.

Figure 2:
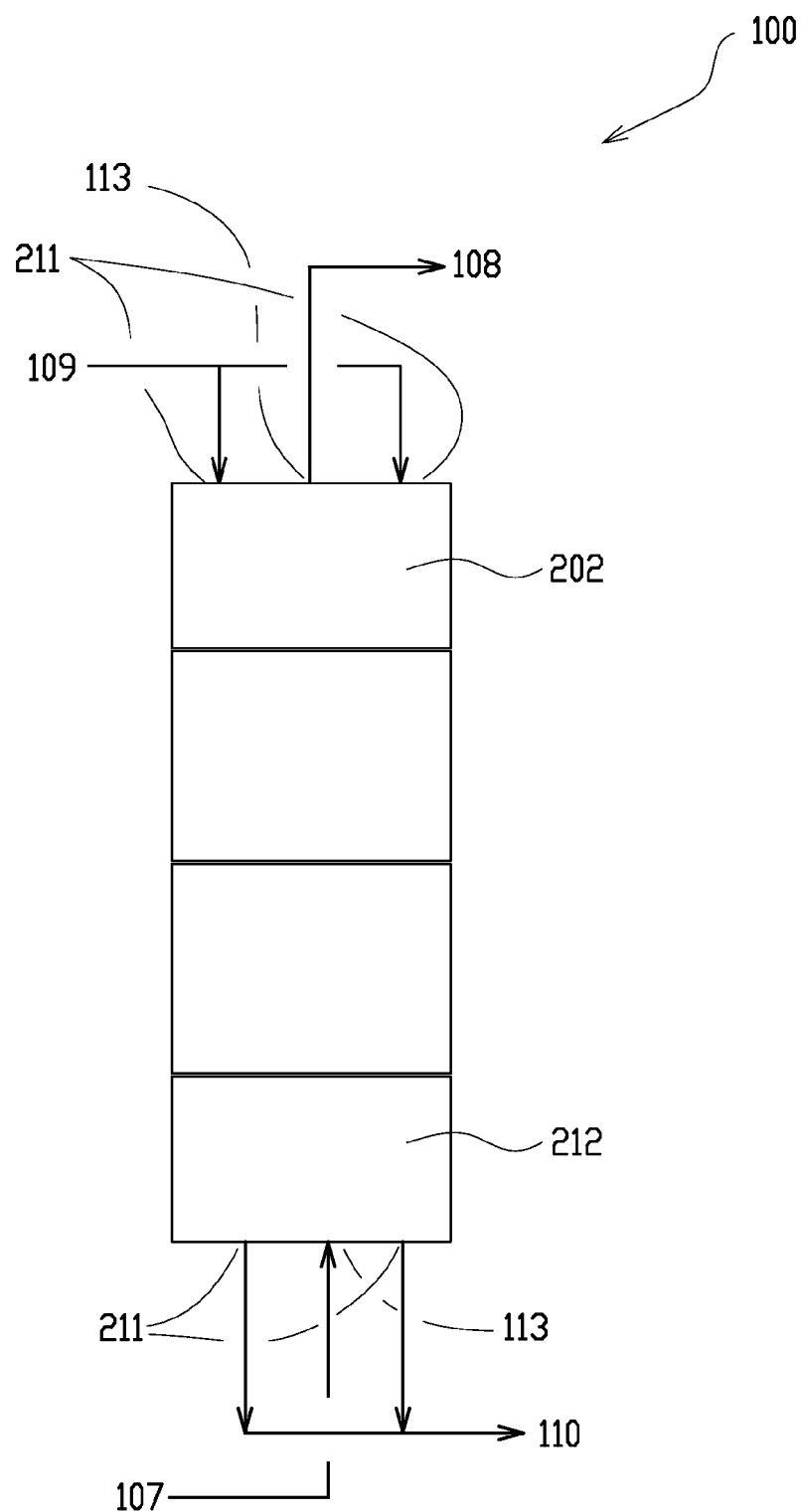
FIG. 2 is a schematic view of a heat exchanger similar to FIG. 1 showing alternative locations for inlet and outlet flows, according to an illustrative embodiment of the invention.

FIG. 2 is a schematic view showing an alternate configuration of header blocks 202 and 212 with streams 109 and 110 entering on the ends instead of the sides of the header blocks. Different endcap designs understood by those skilled in the art are then needed and not further described here.

Figure 3:
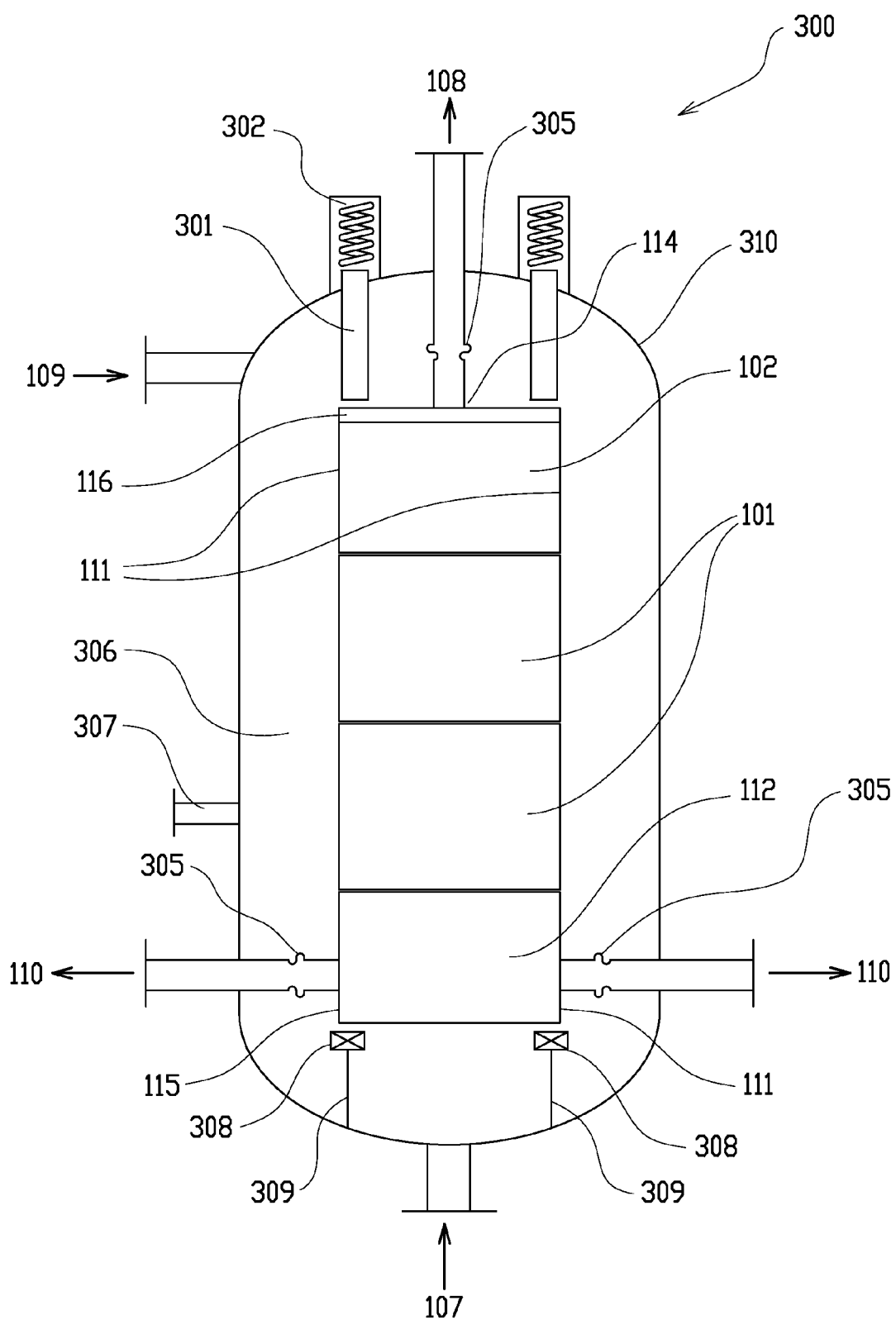
FIG. 3 is a schematic cross sectional view of a heat exchanger assembly of a design similar to FIGS. 1 and 2 and placed inside a separate containment vessel, according to an illustrative embodiment of the invention.

FIG. 3 shows a schematic view, according to an illustrative embodiment of the invention. The heat exchanger assembly is placed within a containment vessel 310 that may be a metallic pressure vessel, for example. That pressure vessel could be polymer or glass coated or otherwise treated by methods known to those skilled in the art to meet desirable corrosion resistant properties suitable for the fluids and conditions of use. In this configuration, flow streams 107, 108, and 110 and their routings are analogous to those of FIG. 1 with the added feature of expansions joints 305. Stream 109 could be fluidly connected to ports 111 via pipe and expansion joint similar to streams 107, 108, and 110, or can be allowed to fill the cavity 306 around the heat exchanger and flow into ports 111. Cavity 306 could thus be dry, wetted by fluid 109, or wetted by any other fluid used to pressurize cavity 306 from port 307. Endcap 117 is replaced by a support ring 309 sealed against header block 112 using packing or gaskets 308. Springs 302 and beam assemblies 301 keep the stack of heat exchanger blocks, headers, and endcaps held tightly together and accommodate differential thermal expansion between the containment vessel 310 and the heat exchange stack.

Figure 4:
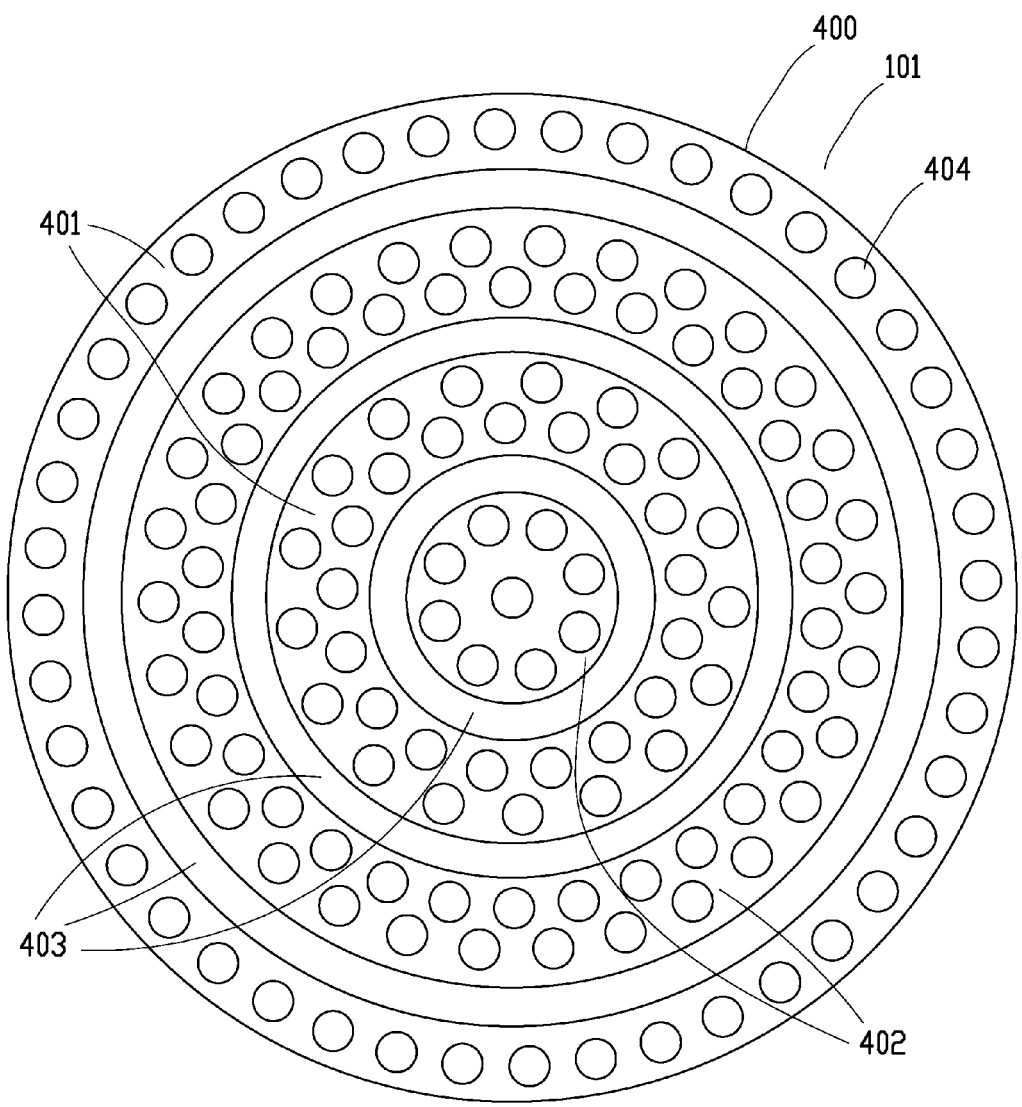
FIG. 4 is a schematic view of the top of one heat exchange block, according to an illustrative embodiment of the invention.

FIG. 4 is an end view of one heat exchanger block 101, according to an illustrative embodiment of the invention. A plurality of holes are bored axially through the block 101 from end to end in concentric rings 401 and 402 separated by baffles 403. Gaskets or a suitable adhesive cement or other means known to those skilled in the art are used to seal concentric rings 401 from rings 402. Any number of concentric flow channels can be used in the heat exchanger blocks based on the desired surface area, length, diameter, etc of the finished heat exchanger. Any given channel 401, 402 could have one or more rows of holes. In this illustration, one row of holes is used for the inner and outer channels and two rows for the intermediate channels. Holes of different channels could be of the same or different size. Holes within the same channel could be of different sizes.

Figure 5:
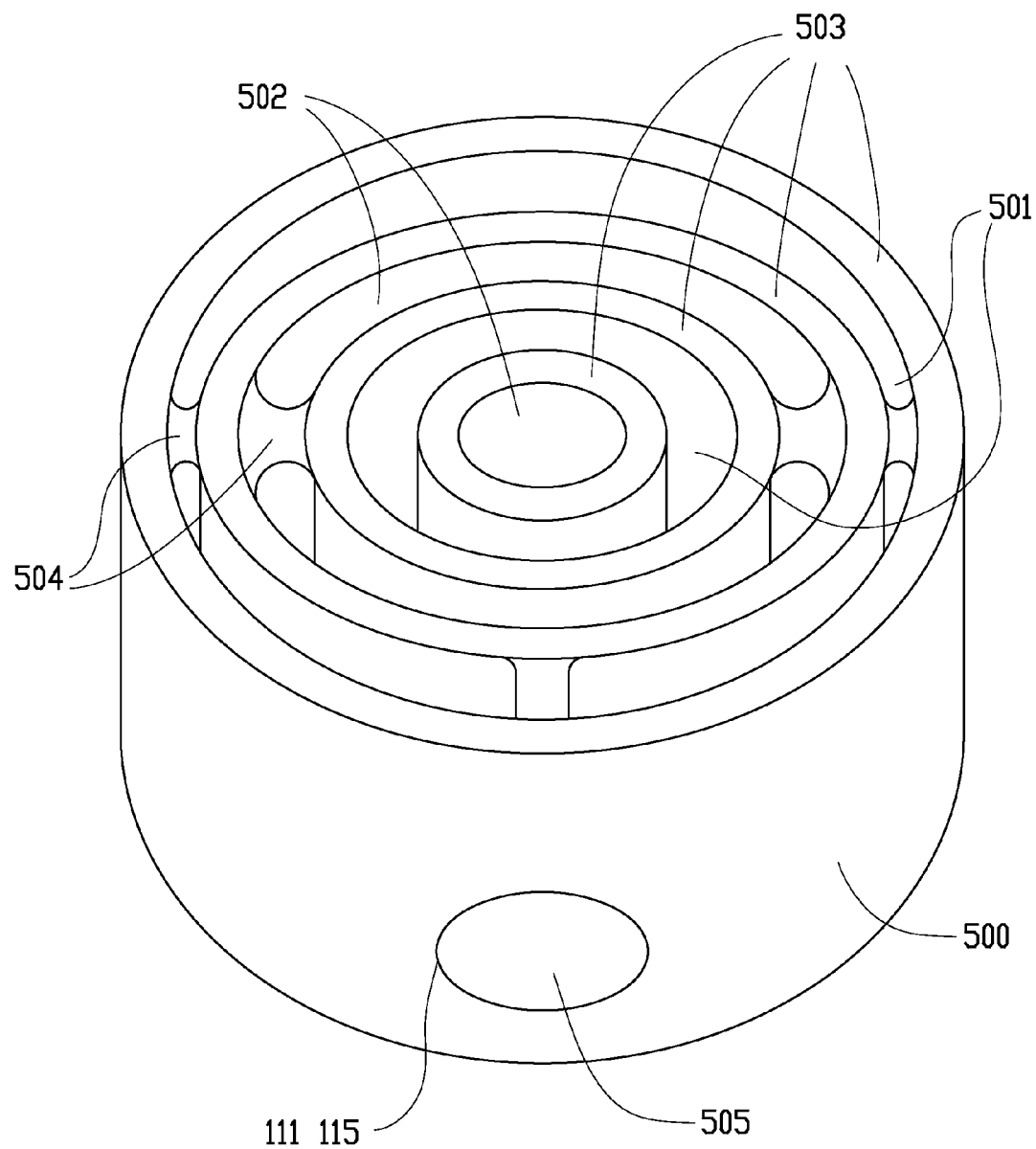
FIG. 5 is a schematic isometric view of a header transition block, according to an illustrative embodiment of the invention.

FIG. 5 is an isometric schematic view of a header block 500 showing the side of the header block that faces the heat exchanger, according to one illustrative embodiment of the invention. Tongues 503 mate against grooves 403 (FIG. 4) of heat exchanger blocks 101. Channels 401 and 402 flow into channels 501 and 502 respectively. Channels 502 are fluidly connected to cross channel 505 and sideports 111 or 115. Partitions 504 are placed in the header block for mechanical support.

Figure 6:
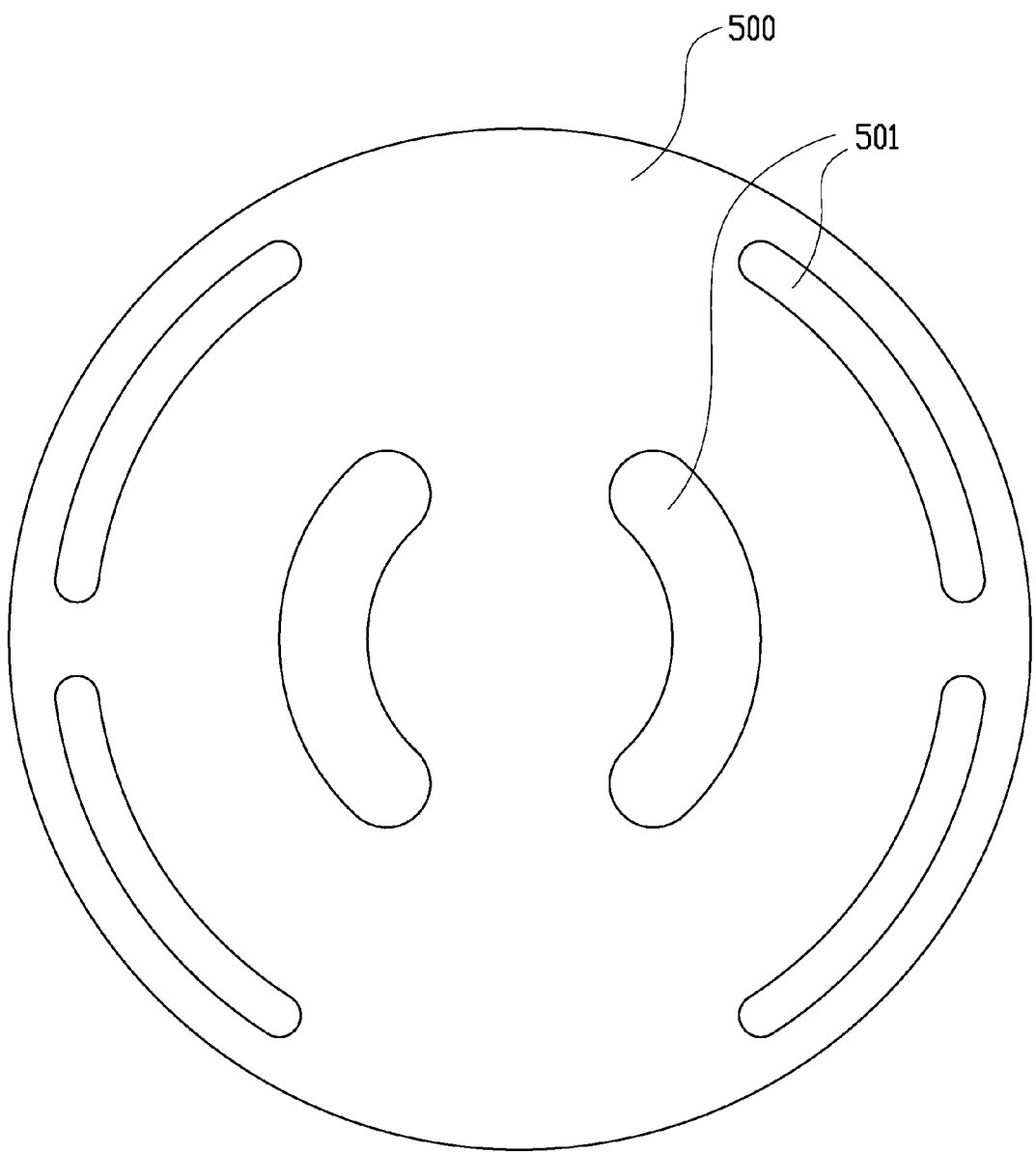
FIG. 6 is a schematic view of a header block showing the outside end facing away from the heat exchanger block, according to an illustrative embodiment of the invention.

FIG. 6 is a schematic view of a header block 500 showing the side facing away from the heat exchanger block 101, according to one illustrative embodiment of the invention. It shows the side of channel 501 opposite that of FIG. 5. The fluid that is not flowing through the cross flow channel flows out in an axial direction through channel 501.

Figure 7:
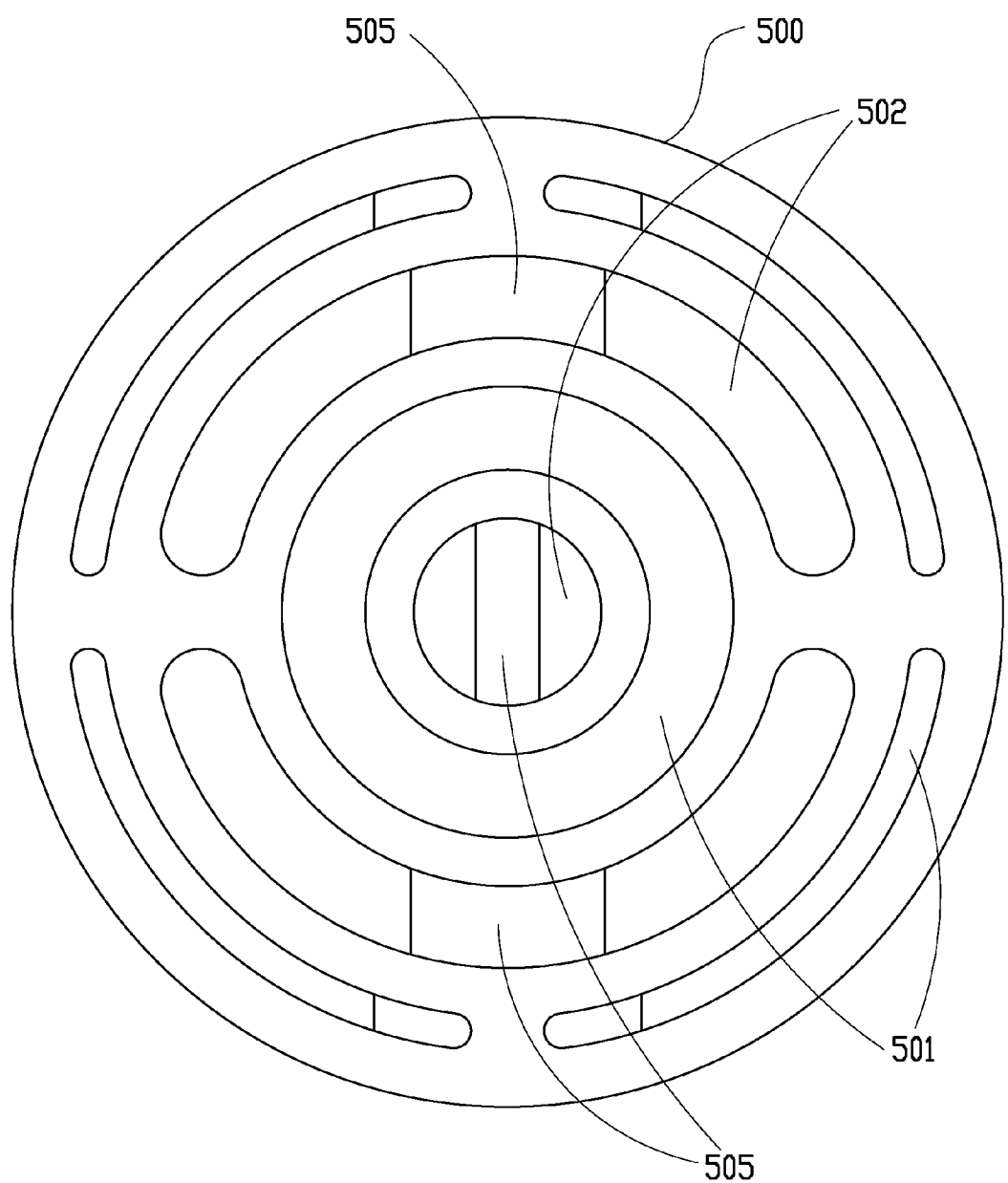
FIG. 7 is a schematic view of a header block showing the inside end of the header block butted against the heat exchanger block according to an illustrative embodiment of the invention.

FIG. 7 is a schematic view of header block 500 according to one illustrative embodiment of the invention. It shows the configuration of cross flow channel 505 fluidly connected to channels 502 and not fluidly connected to channels 501. Note that cross flow channel 505 could be connected to either channels 501 or 502 but not both in the same header block. Channel 505 could be connected to channel 501 in the header block at one axial end of the heat exchanger and channel 502 in the header block at the other axial end of the heat exchanger. Appropriate connections different from these illustrations and understood to those skilled in the art would then be made to the inlet and outlet streams. Cross flow channel 505 can be open to channel 501 from greater than zero to 360° of its circumference where the two intersect. Normally, cross flow channel 505 is open to channel 501 or 502 between 50 and 100% of the cross flow channel's circumference.

Figure 8:
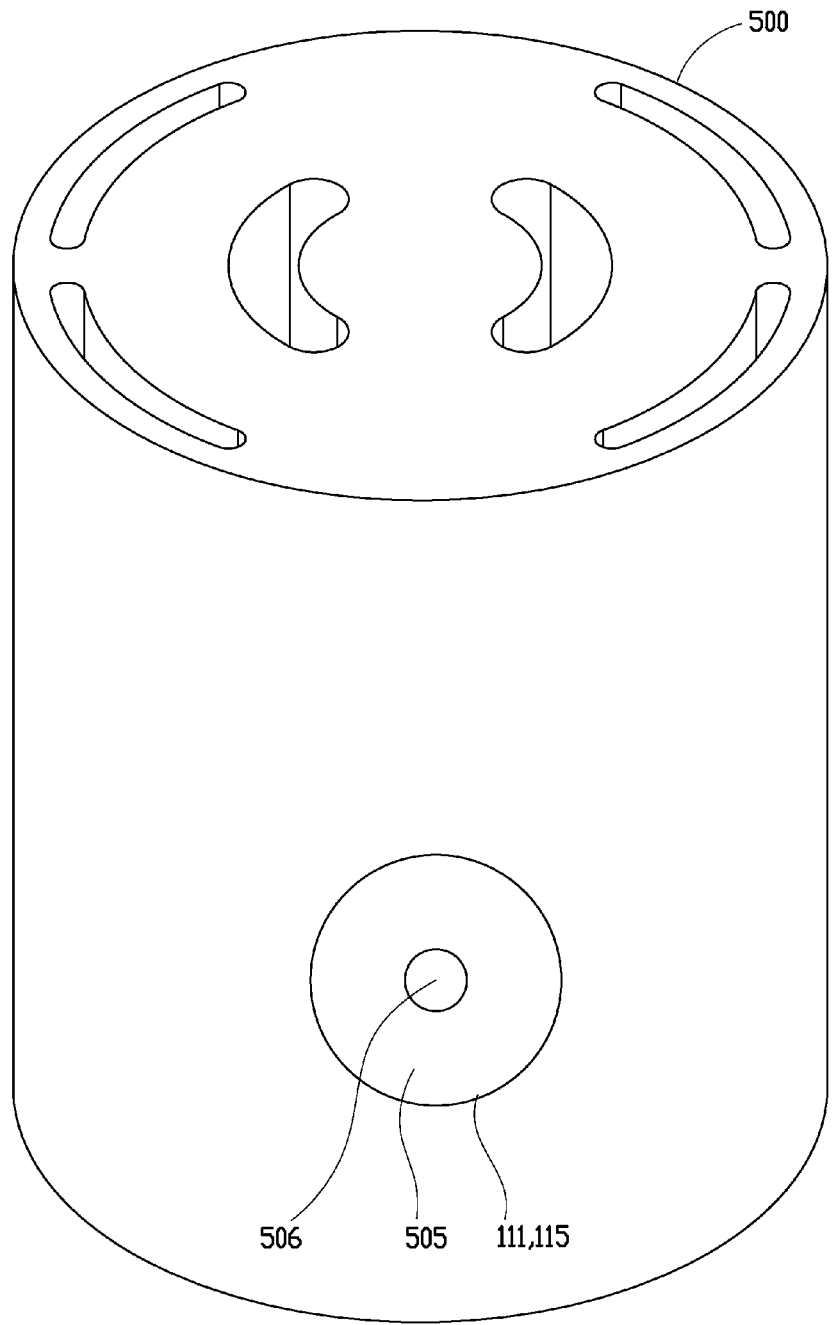
FIG. 8 is a schematic isometric side view of a header block showing the cross flow channel directing flow to one flow direction within the heat the heat exchanger blocks within the assembly, according to an illustrative embodiment of the invention.

FIG. 8 shows an isometric side view of header block 500 according to one illustrative embodiment of the invention. It shows port 111 or 115, cross flow channel 505, and reduced bore of cross flow channel 505 to diameter 506 toward the center of the header block. One or more diameters for cross flow channel 505 can be used. One or more cross flow channels 505 can be used.

Figure 9:
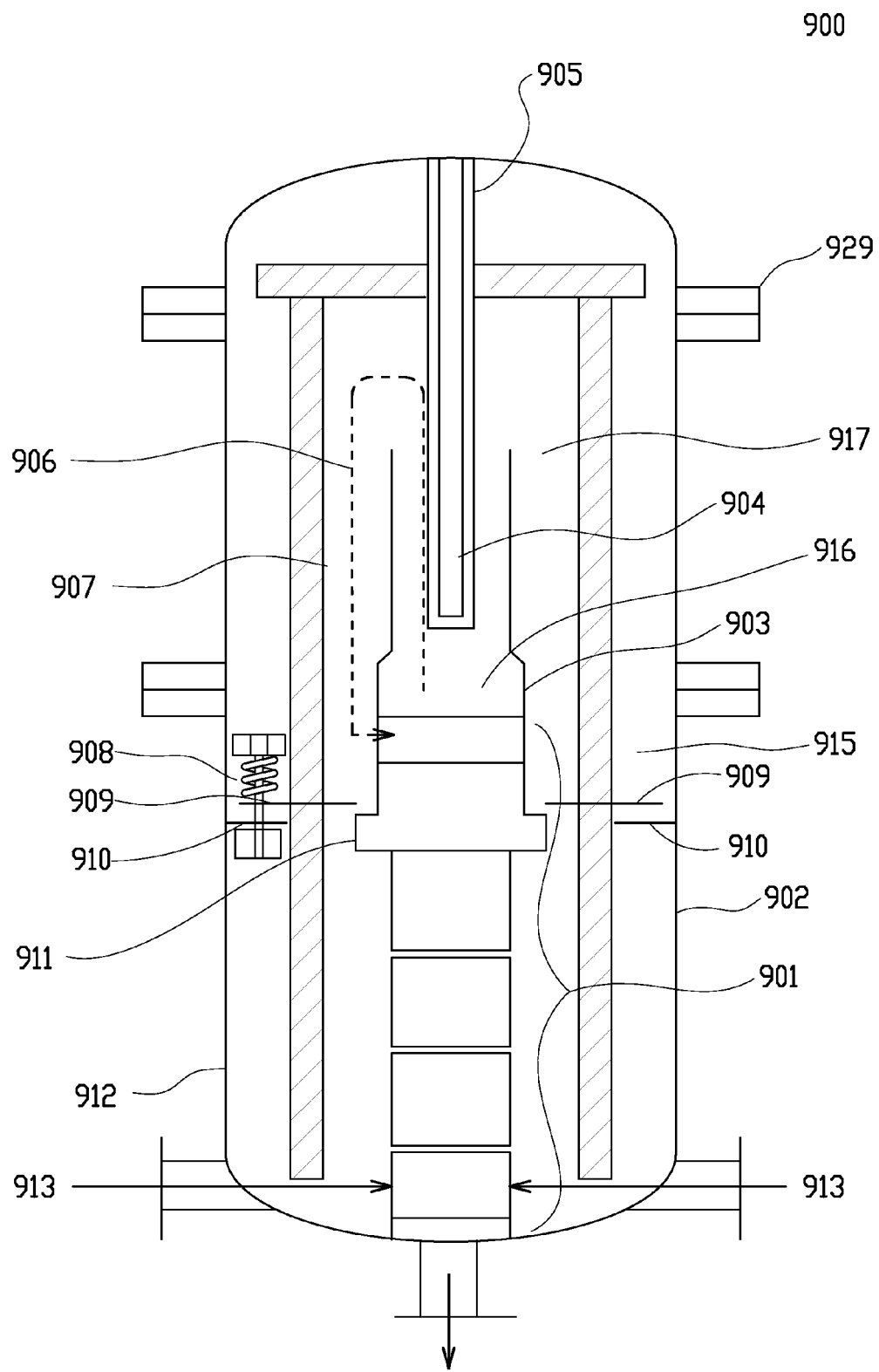
FIG. 9 is a schematic, cross sectional view of an STC hydrogenation reactor, according to an illustrative embodiment of the invention.

FIG. 9 shows a schematic view of an STC hydrogenation reactor according to one illustrative embodiment of the invention. The reactor is comprised of a water jacketed containment vessel 902, heat exchanger assembly 901 of the design described herein, a heating zone baffle 903, a heating element 904, a heat susceptor 905, a reaction zone 906 defined by the boundary outside the heating zone baffle and inside the insulation 907.

Figure 19:
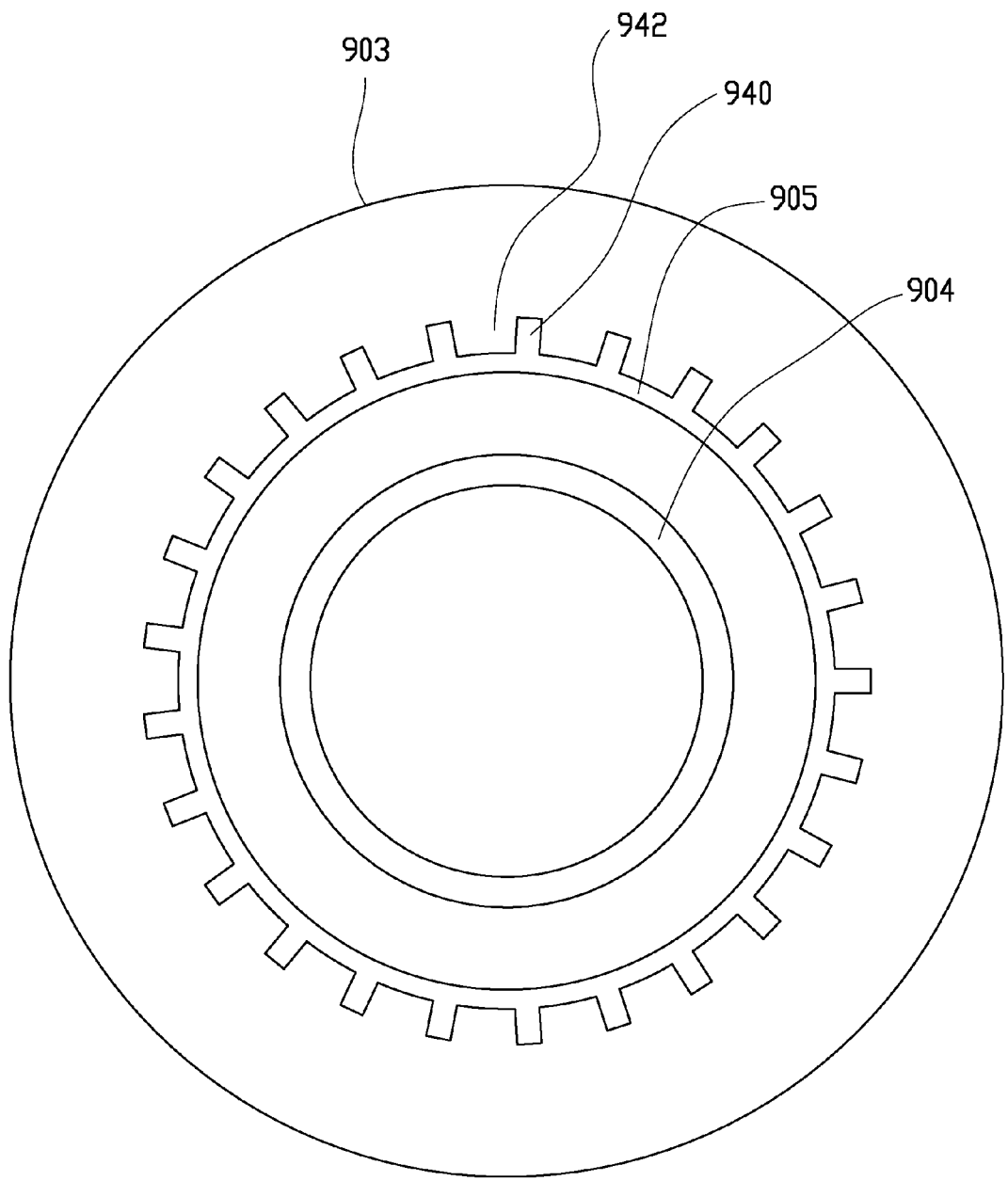
FIG. 19 is a schematic cross sectional end view of the susceptor, heater and baffle showing fins on the outside diameter of a susceptor to increase area available for convective heat transfer and thus reduce the temperature of component parts.

FIG. 19 shows a cross sectional top view of a heater 904 inside a susceptor 905 with axial grooves 942 and ridges 940 inside heating zone baffle 903.

Figure 18:
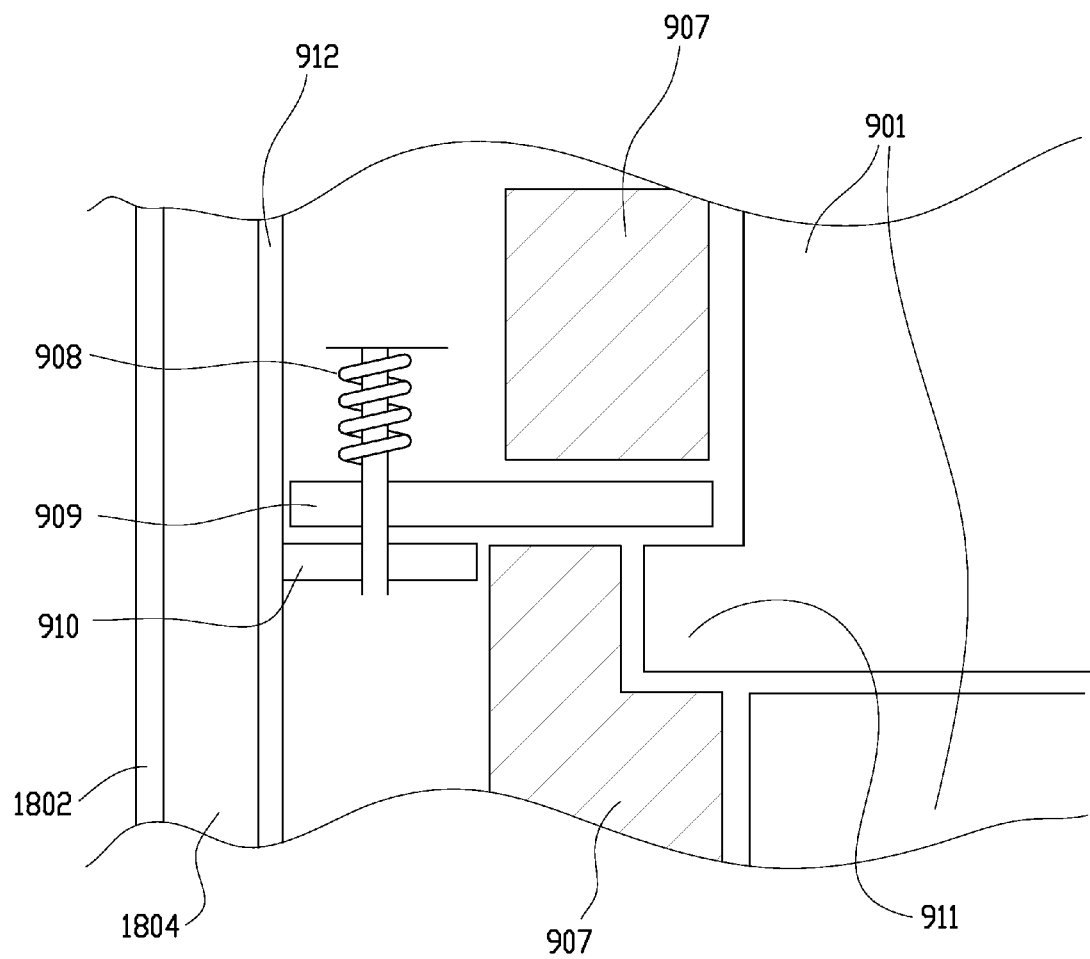
FIG. 18 is a schematic sectional view showing a method used to keep the heat exchanger assembly sealed, according to an illustrative embodiment of the invention.

FIG. 9 also shows the heat exchanger assembly is held in compression by hold down plate 909 pressing against lip 911. Plate 909 is held in place by springs 908 and a support ring 910 on the inside diameter of the containment vessel wall 912. The springs 908 deal with differential thermal expansion of the containment vessel and the heat exchanger assembly and are intentionally placed outside the insulation where the temperature is low enough and the corrosive environment suitable for metallic components. A more detailed view of the compression ring assembly is shown in FIG. 18. All common part numbers in FIG. 18 and FIG. 9 are the same part. A containment vessel jacket 1802 and annular flow channel 1804 are shown in FIG. 18 that are not on the containment vessel in FIG. 9. Vessel 912 can be made with or without a cooling jacket by making other modifications understood by those skilled in the art.

In operation, the hydrogenation reactor 900 has a halosilane feed gas 913 mixed with hydrogen entering above the mixtures dewpoint. The feed gas is heated as it passes through the heat exchanger 901 and enters a heating zone 916 where it is heated by a susceptor 905. The susceptor is heated by one or more heating elements 904, the heating element preferably constructed to minimize the number of electrical connections to maximize reliability. Gas is guided over the susceptor with baffle 903, circular in cross section, and is then routed back to the heat exchanger through channel 917. The gas then flows into the interchanger assembly 901 where it is cooled by feed stream 913 and leaves as stream 914, preferably at a temperature 100-250° C. above the temperature of feed stream 913.

Alternatively, the gas can flow out of side ports on the top header block of heat exchanger 901, around the baffle 903 and then over the susceptor 905 before being routed back to the heat exchanger 901 by baffle 903.

Figure 10:
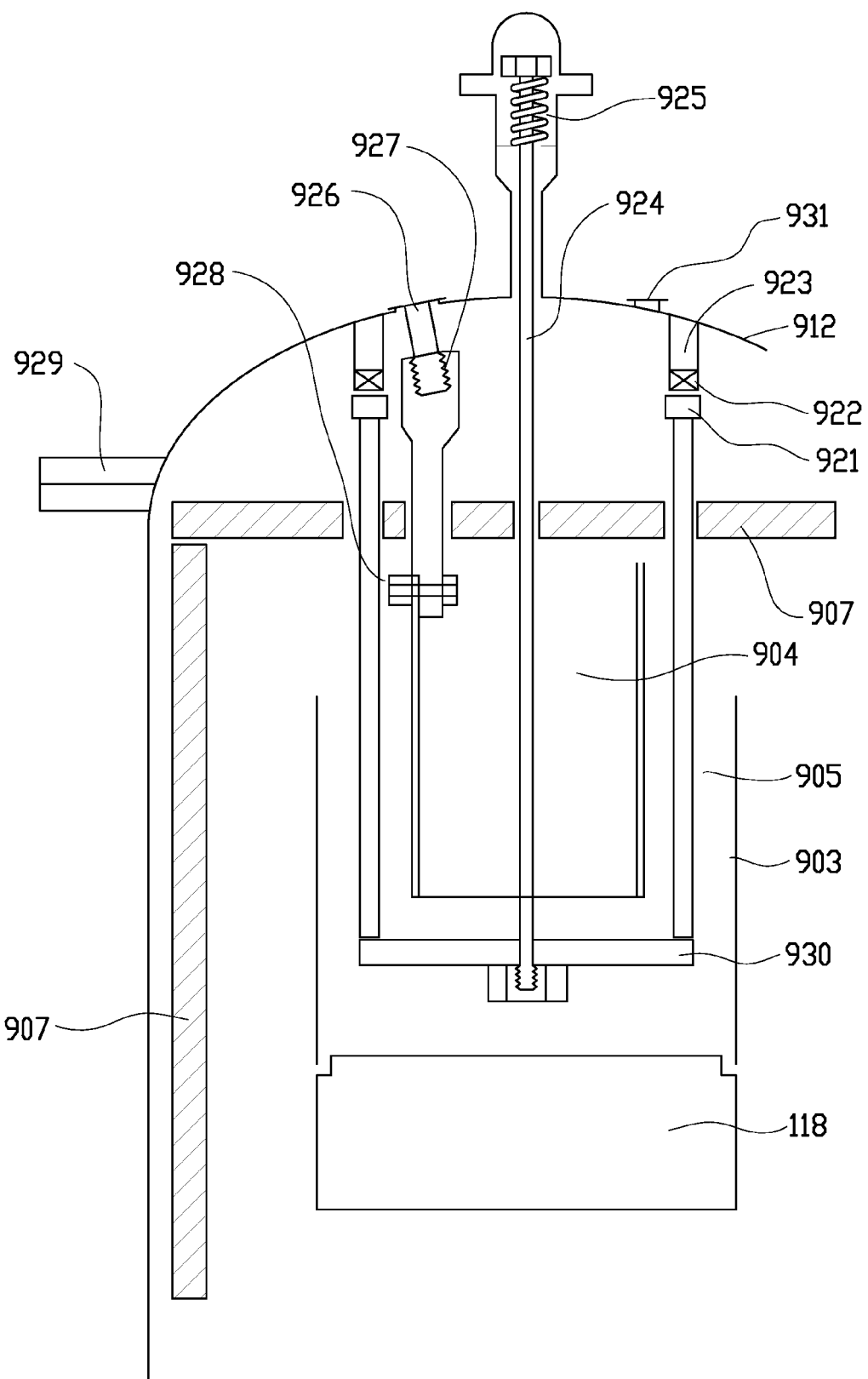
FIG. 10 is a schematic view of a portion of the heating zone, according to an illustrative embodiment of the invention. It shows the heating element enclosed within a susceptor enabling the heating element to be purged to dilute or exclude the reactive gases.

FIG. 10 shows a schematic cross section of the heating zone of the reactor with a susceptor according to one illustrative embodiment of the invention. The susceptor 905 is held against a support ring 923 by tie-rod 924 and bottom plate 930. A thermal break 921 and gasket 922 provide a seal and insulate the susceptor from the containment vessel 912. The interior of the susceptor 904 can be purged and/or maintained at a slight positive pressure with respect to the heating zone 916 in order to exclude the process gases from the interior of the susceptor with an inert gas such as argon admitted through port 931. As shown in FIG. 19, the surface area of the exterior of the susceptor can be increased by, for instance, cutting axial fins 940 and grooves 942 in its periphery. By increasing the external surface area of the susceptor 905, increased surface area for convective heat transfer is created and temperatures can be reduced or controlled in a desired range. Electricity is provided to the heating element 904 through water cooled metallic electrode 926 and graphite chuck 927. Ceramic insulators such as silicon nitride, alumina, zirconia or quartz are used to isolate all electrical components from other conductive surfaces to prevent an undesirable earth ground or short circuit. Thermal insulation 907 is provided to protect the containment vessel from hot process gases and radiation from the heating element or susceptor and reduce thermal losses.

Figure 11:
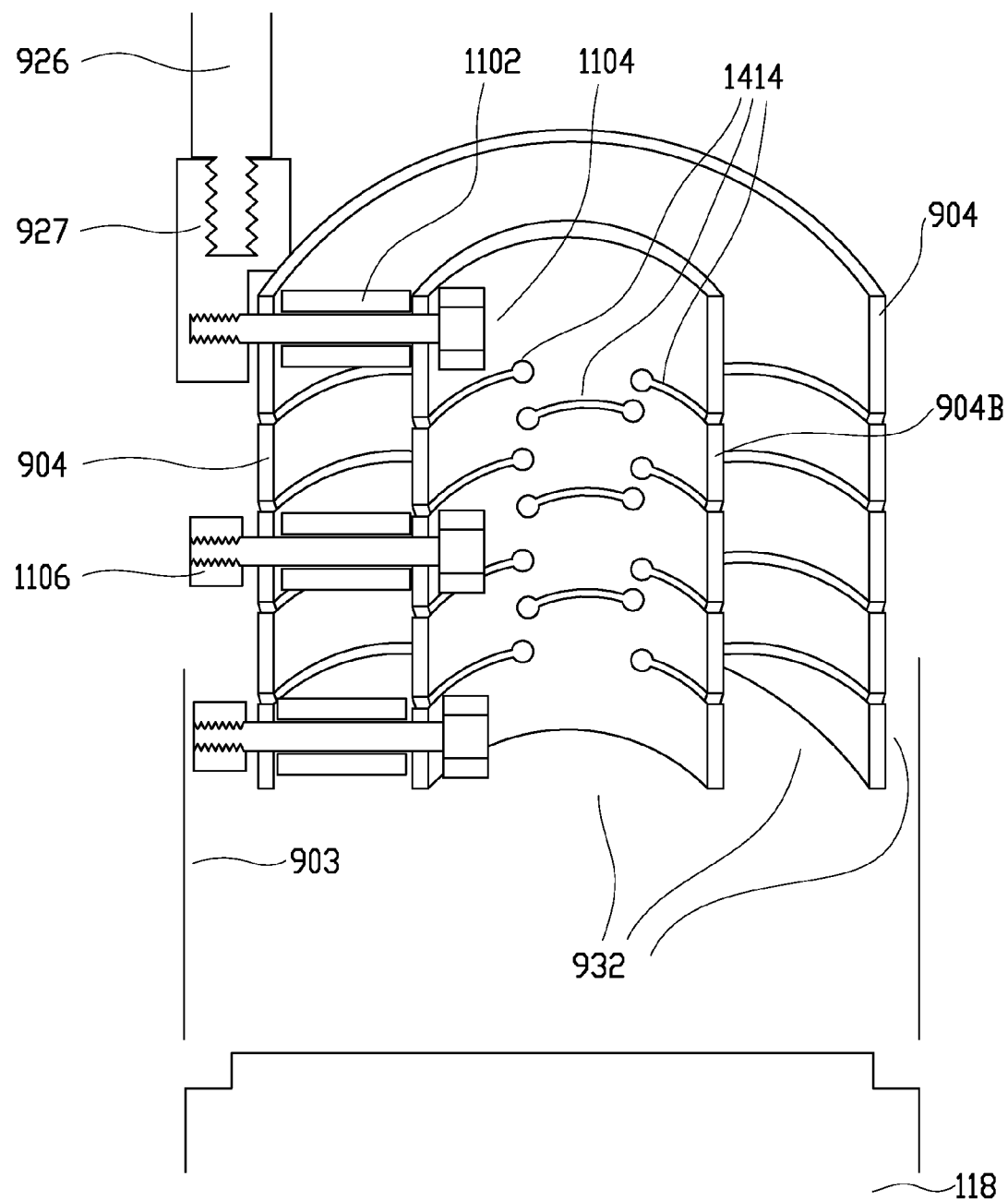
FIG. 11 is a schematic view showing a heating element according to an illustrative embodiment of the invention. It consists of two concentric cylindrical heating elements, each with a serpentine cut and connected together for structural rigidity.

FIG. 11 shows schematic cross section of the heating element according to another illustrative embodiment of the invention. The susceptor 905 can be eliminated and gas can flow directly over electrically heated element 904. Heater element 904 can be configured of a cylindrical heating element with serpentine cuts in either the axial or radial orientation or both to achieve the desired electrical resistance and power at a given supply voltage. Heating element 904 can consist of one or more concentric cylindrical heating elements that can be bolted or otherwise fastened or bonded together at points where voltage is equal to stiffen the heater elements. (it can be joined together at locations where voltages are unequal if electrical insulating materials are used to prevent undesirable current flow, or if current flow through the device connecting the elements doesn't create unacceptable heat generation). These concentric elements can be fabricated as one piece or as separate pieces and fastened together. Due at least in part to the small number of electrical connections and a body flange 929 on the containment vessel 912, the heating element 904 may be easily removed from the reactor 900 and replaced. In another embodiment, a shorter heater is utilized to reduce cost and/or improve stiffness.

In certain embodiments, the power supply provides the heating element 904 with a voltage or current that is controlled to achieve a particular target value. For example, the voltage or current supplied to the heating element 904 may be regulated to achieve one or more of a desired heat transfer rate Q, a heater 904 surface temperature, or a desired temperature of the reactant gas. A control system used to achieve the target value may employ feedback and/or feed forward algorithms. For example, the control system may have a microprocessor that receives an input signal from a sensor (e.g., a flow sensor and/or a temperature sensor) and adjusts the voltage or current to achieve the target value.

The heat exchanger 101 and header blocks 112, 118 are made of a thermally conductive and stable material and preferably include a coating. In one embodiment, the blocks are made of carbon (e.g., graphite) and/or a carbon/carbon composite. In another embodiment, the coating includes, for example, silicon carbide (SiC), zirconium carbide (ZrC), hafnium carbide (HfC), tantalum carbide (TaC), titanium carbide (TiC), niobium carbide (NbC), hafnium oxide ($HfO_2$), silicon oxide ($SiO_2$), zirconium oxide ($ZrO_2$), tantalum oxide ($Ta_2O_5$), yttrium oxide ($Y_2O_3$), titanium oxide ($TiO_2$), and/or aluminum oxide ($Al_2O_3$). In certain embodiments, the coating is SiC In one embodiment, the coating covers all surfaces of each block including surfaces that have an operating temperature of less than 700° C. For example, in certain embodiments, all holes 404 in the heat exchange blocks and all surfaces in the header blocks and heat exchanger blocks are coated. The coating may prevent chemical attack of the blocks and/or diffusion or permeation of gases through the blocks Even at lower temperatures, e.g., below 700° C., when the heat exchanger blocks 101 are made of graphite, flow of gas through the portions of the blocks forming the barrier between adjacent channels may be a problem, and coating the entire heat exchanger block 101 surface with silicon carbide would be expected to remedy this problem.

An approach temperature for the heat exchanger 100 is a temperature difference between the product gas and the reactant gas. Referring again to FIG. 1, as used herein, the "approach temperature" is a temperature difference between the product gas and the reactant gas at ports 114 and 111, or ports 113 and 115. In certain embodiments, the approach temperature is less than about 200° C., less than about 150° C., or less than about 100° C. In one embodiment, lower approach temperatures are obtained by preheating the reactant gas before it enters the heat exchanger 901, using, for example, an additional heat exchanger or heater. In another embodiment, the approach temperature is modified by increasing or decreasing the number of heat exchanger blocks 101. The reactant gas temperature at the reactor inlet ports 115 may be between about 80° C. (e.g., with zero preheating) and about 500° C. (e.g., using an external metallic heat exchanger).

While the depicted heating element 904 is one or more cylindrical plates, alternative embodiments may use other shapes, such as rods, for the heating element. By using more or less surface area and controlling gas flow rates a great deal of flexibility can be achieved in the actual heating element temperature.

In certain embodiments, the heating element 904, baffle 903 and susceptor bottom plate 930 is made of a carbon/carbon composite material and includes a coating. The chucks 927 and susceptor 905 may be made of carbon/carbon composite materials or graphite, including a coating. The coating may include, for example, silicon carbide (SiC), zirconium carbide (ZrC), hafnium carbide (HfC), tantalum carbide (TaC), titanium carbide (TiC), niobium carbide (NbC), hafnium oxide ($HfO_2$), silicon oxide ($SiO_2$), zirconium oxide ($ZrO_2$), tantalum oxide ($Ta_2O_5$), yttrium oxide ($Y_2O_3$), titanium oxide ($TiO_2$), and/or aluminum oxide ($Al_2O_3$).

In certain embodiments with an open heater, a cross-sectional area $A_f$ available for flow within the heating zone 916 is defined by a radius of baffle 903. In one embodiment, the radius R is about 150 mm. The cross-sectional area $A_f$ available for flow is approximately $A_f = \pi R^2$. In addition, due to a small radial thickness T1 of the heating element 904, a heat transfer area $A_h$ of a single heating element 904 (including inner and outer surfaces of the heating element) is approximately $A_h = 4\pi R_2 L_2$. In certain embodiments, therefore, a ratio Y of the heat transfer area $A_h$ to the cross-sectional area $A_f$ available for flow is approximately $Y = 4R_2 L_2/R^2$. In certain embodiments, depending on the values chosen for axial length $L_2$ and heater 904 diameter, the ratio Y is from about 20 to about 50. If a two element concentric heater is used, the ratio Y becomes about 35 to 90. Three or more concentric heater elements could be used together if advantageous, as in larger capacity reactors, to drive surface temperatures down via increased heat transfer area, or to increase stiffness when coupled with bracing between the elements.

In certain embodiments when the diameter of the baffle 903 is substantially the same diameter as heat exchanger block 101, an average velocity of the reactant gas within the cylindrical heating zone 916 is between about 3 m/s and about 10 m/s. In one embodiment, an average mass flux of the reactant gas through the cross-sectional area $A_f$ available for flow is between about 20 kg/($m^2$-s) and about 60 kg/($m^2$-s). In certain embodiments, a residence time for the reactant gas in the cylindrical heating zone 916 is between about 0.1 seconds and about 0.4 seconds.

In certain embodiments, a heat transfer rate Q between the heating element 904 and the reactant gas is between about 800 kW and about 3500 kW. The heat transfer rate Q may be expressed as $Q = h A_h \Delta T$, where h is a heat transfer coefficient, $A_h$ is the heat transfer area of the heating element 904 (including inner and outer surfaces of the heating element), and $\Delta T$ is a difference between a heating element temperature and an average temperature of the reactant gas in the heating zone 916. In certain embodiments, the heat transfer coefficient h is between about 5000 W/($m^2$-K) and about 2000 W/($m^2$-K). In one embodiment, a temperature of the heating element 904 is less than about 1200° C. In another embodiment, a temperature of the heating element 904 is between about 950° C. and about 1450° C.

In certain embodiments, as a result of the heat transfer within the heating zone 916 a temperature of the reactant gas increases within the heating zone 916 by greater than about 100° C., greater than about 150° C., or greater than about 200° C. When the reactant gas exits the heating zone 916, a temperature of the reactant gas is above the temperature needed for an efficient hydrogenation reaction to occur (e.g., greater than about 900° C.).

FIG. 11 is a schematic cross section of a heating element comprised of two separate cylindrical heating elements that have been joined using spacers 1102 and fasteners 1104 and 1106. The preferred approach is to place the spacers on places where the electrical potential within the heating elements 904 and 904B are substantially the same to avoid potential hot spots. Alternatively, the spacers and fasteners can be made of non-conductive materials.

Figure 12:
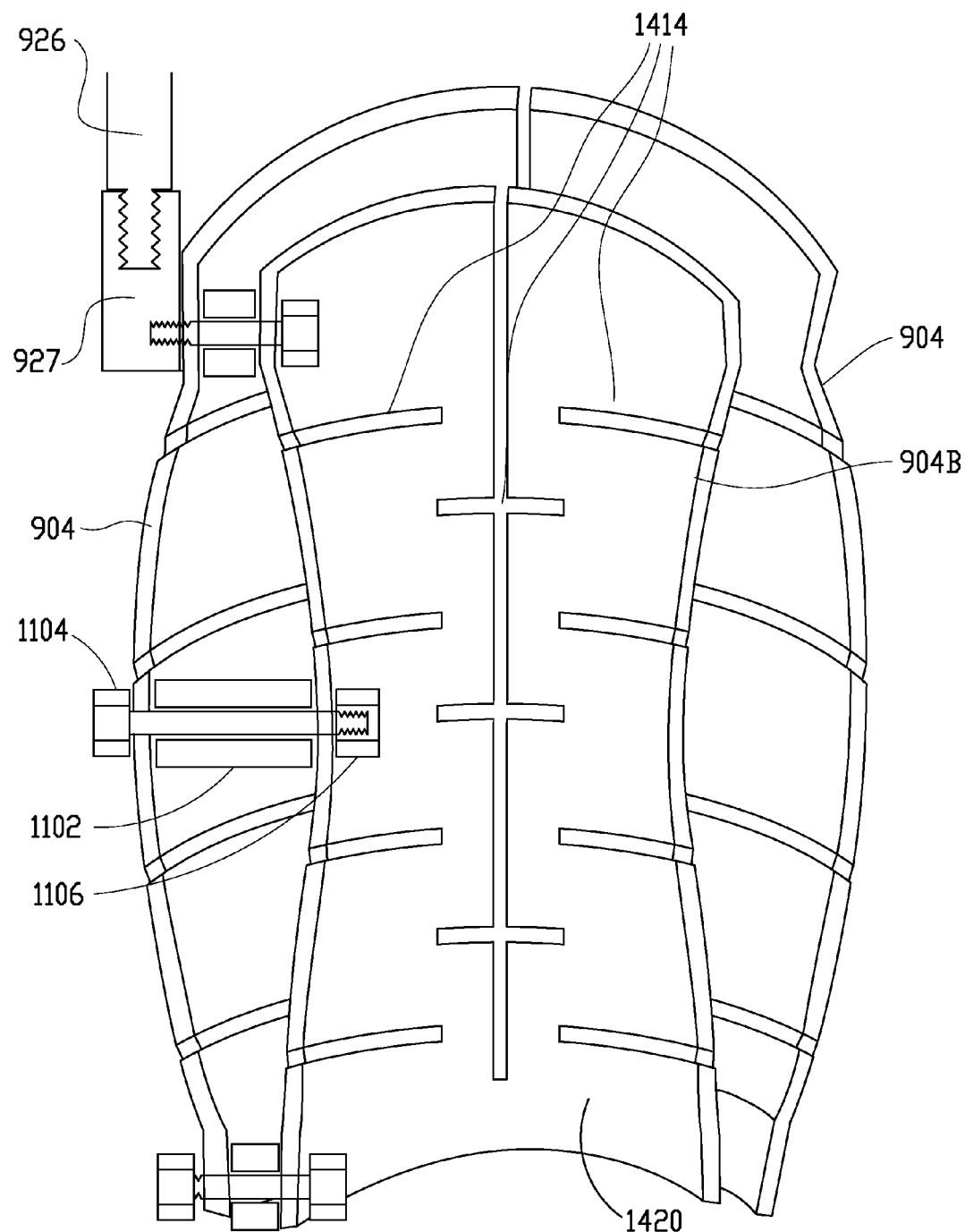
FIG. 12 is a schematic view showing a method of stiffening a heating element to avoid vibration by deflecting it from its relaxed state, according to an illustrative embodiment of the invention.

FIG. 12 is a schematic cross sectional view of a multi-cylinder heating element where the spacers 1102 and fasteners 1104, 1106 are used to mechanically deflect the heating element away from its relaxed state in order that greater force must be exerted by the flowing fluid to further deflect the elements 904, 904B and cause vibration. In FIG. 12, the diameter of the element is controlled at the top by the electrodes 926 and chucks 927. The diameter at the bottom is controlled by a continuous neutral ring 1420. Excessive vibration would damage SiC coatings and cause premature failure of the heating elements.

Figure 13:
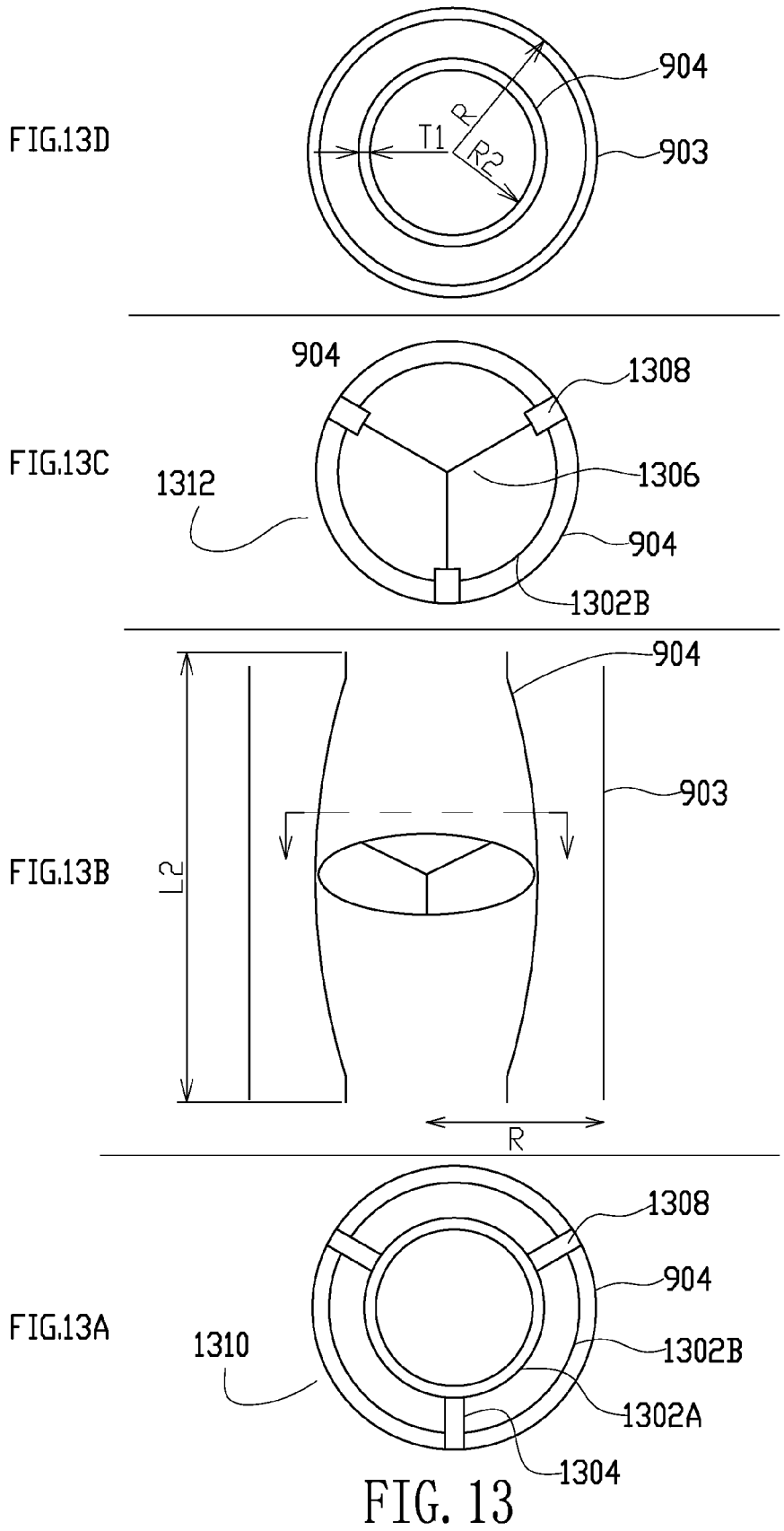
FIG. 13A-D are schematic views of a heating element, showing another method to stiffen it to prevent undesirable vibration or deflection, according to illustrative embodiments of the invention.

FIG. 13B is a schematic cross sectional view of a single heating element 904 that has been deflected with center hoops 1302A, 1302B or a hub and spoke spacer 1306 as an alternative method of achieving a deflection away from the relaxed position. FIG. 13C, spacers 1308 are used to press against the heating element 904 forcing the diameter to be larger at the center. Hoops 1302A and/or 1302B hold the spacers 1308 in place. It should be understood that an analogous design could result in a reduced diameter at the center. The diameter at the top and bottom of the heater are controlled as was described for FIG. 12. In this figure, spacers 1308 must be non-conductive and would be made of a suitable ceramic material such as silicon nitride or alumina. One or more of hub and spoke assemblies 1312 could be installed in a single heating element.

Figure 14:
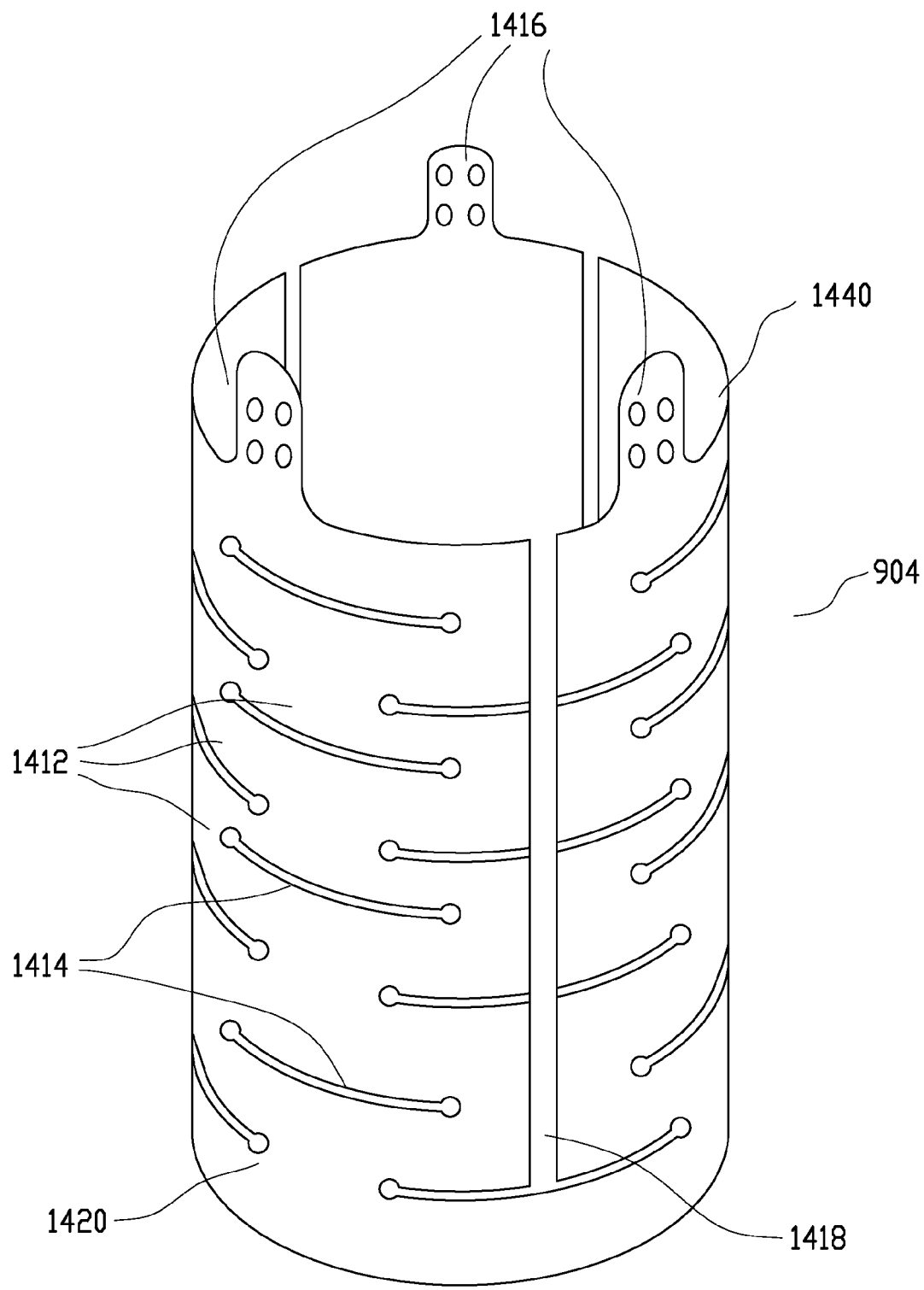
FIG. 14 is a schematic isometric view of a heating element showing serpentine and axial cuts to create the desired electrical resistance, according to an illustrative embodiment of the invention.
Figure 15:
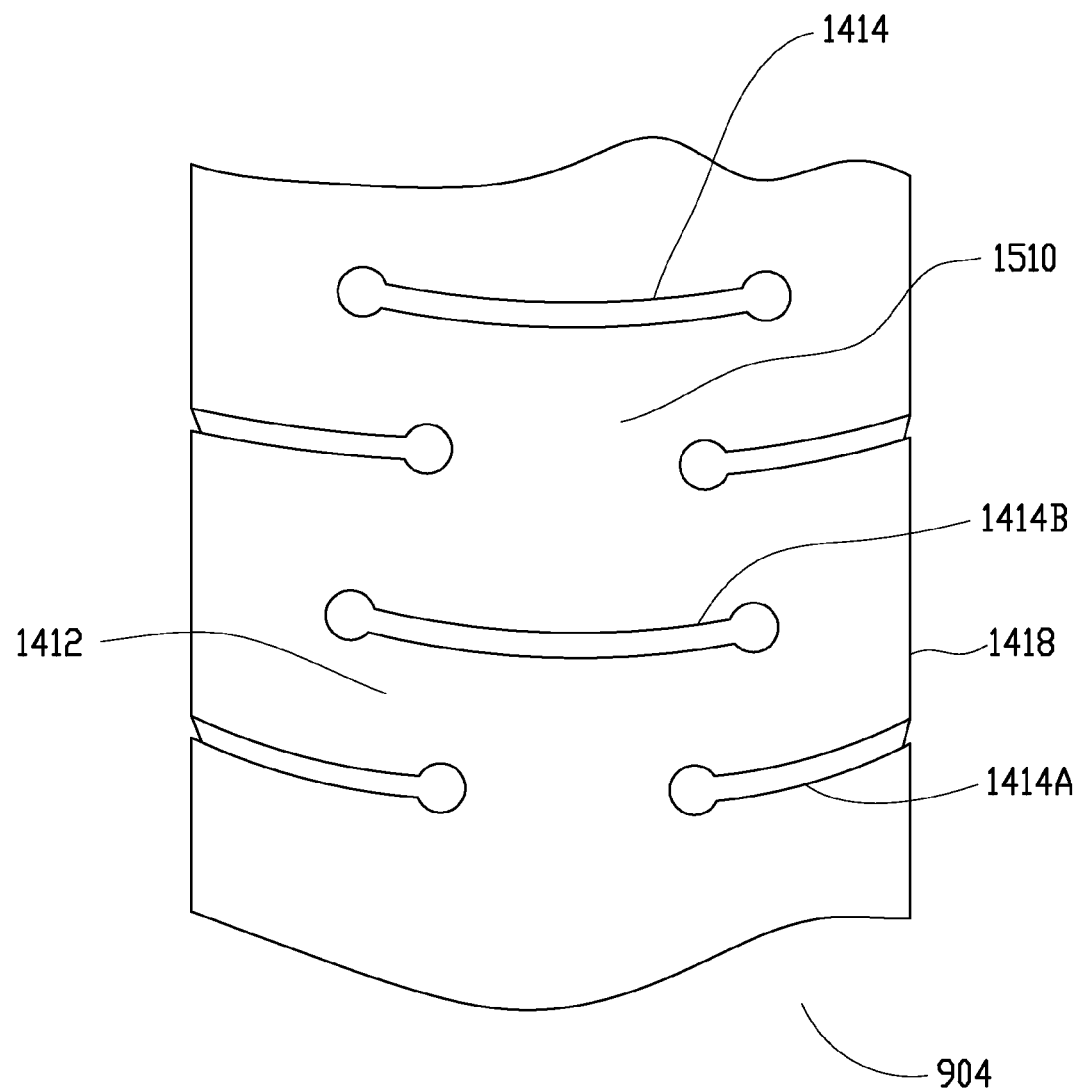
FIG. 15 is a schematic partial view of the heating element showing detail of the serpentine cuts, according to an illustrative embodiment of the invention.
Figure 16:
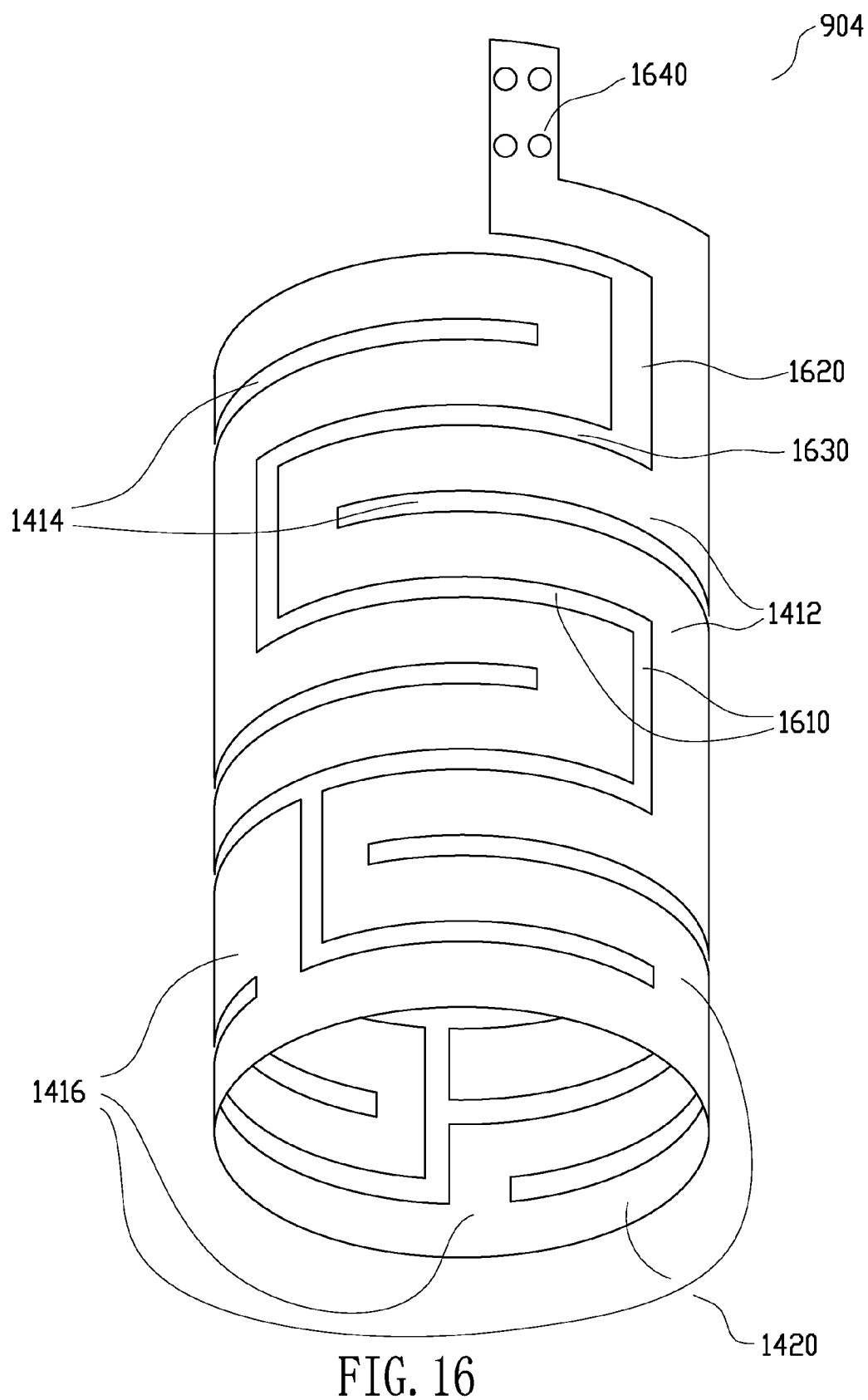
FIG. 16 is a schematic isometric view of the heating element showing an alternative serpentine cuts according to illustrative embodiments of the invention.

FIGS. 14, 15, and 16 are schematic views of the heating element 904 in accordance with an embodiment of the invention. As depicted, the heating element 904 includes a plurality of serpentine electrical paths 1412 defined by a plurality of circumferential slots 1414. 1420 is preferably a floating neutral for 3 phase AC power, or simply an extension of the electrical path connecting two electrodes for single phase AC or DC power. Alternatively, the serpentine paths 1412 may be defined by slots running in the axial direction, or other directions. As a result of the serpentine paths 1412, electricity must travel a greater distance when flowing from the chuck 927 at one axial end of the heating element 904 to the opposite axial ends neutral ring if using 3 phase power, or to the opposite electrode for DC power or single phase AC power. The long flow path allows a high voltage and low current to be utilized reducing the cost of electrical conductors to the electrodes.

In the depicted embodiment, the 3 phase heating element 904 is subdivided into three separate angular sections 1416 (i.e., one section per phase of a three-phase heater) by axial slots 1418 running along an axial direction of the heating element 904. In one embodiment, the axial slots 1418 originate at an axial end of the heating element 904 but do not extend all the way through the heating element 904 to an opposite axial end. Instead, as depicted particularly in FIG. 14, the opposite axial end of the heating element 904 (i.e., without the axial slots 1418) may act as a floating neutral 1420 (e.g., close to zero volts). In the depicted embodiment, there is a gap between the phases created by axial slot 1418 and spacer assemblies such as 1310 or 1312.

Referring to FIG. 15, the circumferential slots 1414 may include connected slots 1414*a*, which are connected to an axial slot 1418, and disconnected slots 1414*b*, which are not connected to an axial slot 1418. Within each angular section 1416, the connected slots 1414*a* are arranged in pairs, with the two slots approaching one another at a midsection 1510 of the angular section 1416. By contrast, the disconnected slots 1414*b* are centered within the angular section 1416 but do not span the distance between the two axial slots 1418 on either side of the angular section 1416. In the depicted embodiment, the connected slots 1414*a* and disconnected slots 1414*b* are arranged in an alternating pattern along the axial direction of the heating element 904. By alternating the slots 1414*a*, 1414*b* in this manner, the serpentine pattern 1412 travels back and forth between the edges of the angular section 1416 (i.e., near the axial slots 1418) and the midsection 1510, as it travels from one axial end of the heating element 904 to the opposite axial end.

Referring to FIG. 16, the heating element 904 may be subdivided into angular sections 1416 by serpentine slots 1610. The serpentine slots 1610 have axial portions 1620 that are aligned with an axial direction of the heating element 904, and circumferential portions 1630 that are aligned with a circumferential direction of the heating element 904.

Figure 17:
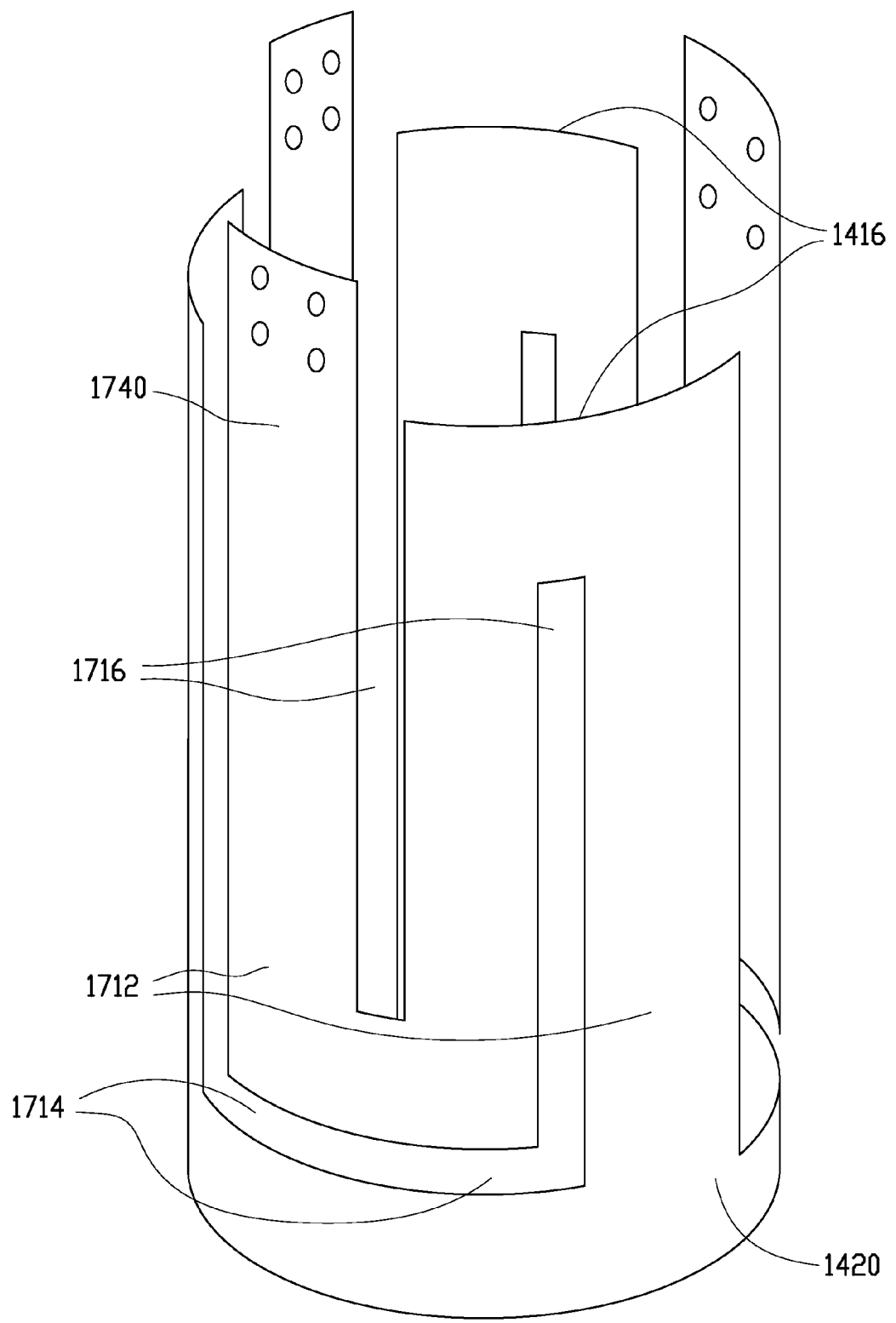
FIG. 17 is a schematic isometric view of the heating element showing another alternative serpentine cut according to illustrative embodiments of the invention.

Referring to FIG. 17, in one embodiment, the serpentine pattern within each angular section 1712 is defined by circumferential slots 1714 and axial slots 1716 that originate on each electrical chuck connection 1740. The resulting serpentine pattern winds back and forth between the axial end where the chuck connects at 1740 and the neutral ring 1420.

Constructive Examples

Standard engineering techniques known to those skilled in the art were used to compare the thermal and hydraulic performance of the counter-current heat exchanger of this invention to a cylindrical cross flow heat exchanger useful in an STC hydrogenation reactor. Heat transfer coefficients can be estimated as flow through a tube using equations such as the Seider Tate equation. Hydraulic performance can be estimated as presented by the Serghides's solution and the Darcy equation. Heat transfer through the solid portion of the heat exchanger is estimated as concentric circular rings using techniques known to those skilled in the art. Taking a cross flow heat exchanger as that found in FIG. 2 of the Fahrenbruck U.S. Patent Application Publication US2012/0328503 A1, which is believed representative of the performance achievable in a cross flow heat exchanger, was used for comparison. It assumes the heat exchanger block referenced in the constructive example is 610 mm diameter by 500 mm long and the shell used to form the outer baffle is 750 mm outside diameter. A total HX length of 6.0 meters is used for comparison. Comparative examples are based on a maximum of 1.4 bar pressure drop with 6 barg outlet pressure. Relative capacity is based on the flow rate achievable with a 175° C. approach temperature with 1.4 bar total combined differential pressure for both passes.

In arriving at the overall assumptions above, the following hypothetical basis is used based on FIG. 2 of the US 2012/0328503 A1 publication:

a. 540 axial holes at 9-11 mm diameter (size estimated. Quantity counted from drawing).

b. 360 radial holes per pass (counted) at an estimated 13-15 mm diameter.

c. Assuming minimal 4 mm separation between holes, the diameter of the center channel is about 210 mm and the outside diameter of the block is about 610 mm. The length of each radial hole is then about 200 mm.

d. Assuming 3 mm minimum separation for radial holes, and 40 mm each for the top, bottom, and center baffle of the heat exchanger block, the height is approximately 500 mm tall.

e. If 70 mm is allowed for the flow channel plus the thickness of the cylindrical graphite shell that must surround the heat exchanger block to direct the radial flow between subsequent passes, the cylindrical shell would be approximately 750 mm outside diameter.

In the example below, for the countercurrent heat exchanger of this invention, 9.5 mm diameter holes are used in the heat exchanger blocks 101 and they are drilled in the pattern of FIG. 4 and as close together as believed practical (3 mm minimum separation). Pressure drop and heat transfer coefficients can be based on simple tubular geometries for the flow paths with only minor errors expected to account for the joints where HX blocks butt against each other. Pressure drop was limited to 1.4 bar to be consistent with the basis used for the comparative cross flow heat exchanger. In this assessment, pressure drop through the header blocks is ignored as being relatively insignificant. The increase in capacity per unit graphite volume required can be attributed to 3 factors:

1. The velocity in the holes bored for fluid flow is greater which increases the heat transfer coefficient.

2. A much greater percentage of the graphite in the block can be bored for fluid flow.

3. The amount of graphite material required for header blocks is much less than the quantity required to form the radial flow channels and outer shell.

It is understood that the foregoing examples are merely illustrative of the present invention. Certain modifications of the articles and/or methods employed may be made and still achieve the objectives of the invention. Such modifications are contemplated as within the scope of the claimed invention.

The invention claimed is:

1. A reactor for hydrogenation of halosilane comprising:

a. a heat exchanger comprising at least three concentric flow channels for counter-current fluid flow, the heat exchanger configured to exchange heat between a reactant gas and a product gas so substantially all net flow is in an axial direction, wherein the reactant gas comprises hydrogen and a halosilane;

b. a heater configured to receive and heat the reactant gas from the heat exchanger; and c. a reaction zone configured to convert the heated reactant gas into product gas.

2. The reactor of claim 1, wherein said heat exchanger further comprises at least one header block, the header block comprising a plurality of concentric channels forming at least two isolated streams.

3. The reactor of claim 2, wherein said at least one header block further comprises at least one radial channel fluidly connected to one of said isolated streams.

4. The reactor of claim 2, wherein said at least two isolated streams are isolated from one another by at least two arcs within said header block.

5. The reactor of claim 1, wherein said heat exchanger, said heater, and said reaction zone are disposed in a containment vessel and said heater is disposed proximate a radial center of the containment vessel and proximate an axial end of the containment vessel.

6. The reactor of claim 1, wherein said heater comprises a cylindrical heating element.

7. The reactor of claim 1, wherein said heater comprises at least two cylindrical heating elements each having serpentine cuts, the at least two cylindrical heating elements disposed concentrically and separated by an annular space.

8. The reactor of claim 7, wherein at least two of said at least two cylindrical heating elements are connected with braces across said annular space.

9. The reactor of claim 7, further comprising a means to deflect said at least two cylindrical heating elements on at least three points along an axial centerline of their concentric disposition.

10. The reactor of claim 1, wherein said heater is disposed in a susceptor isolating said heater from said reactant gas.

11. The reactor of claim 10, wherein an outer diameter of said susceptor comprises axial grooves.

12. The reactor of claim 2, wherein said heat exchanger, said heater, and said reaction zone are disposed in a containment vessel, and wherein said heat exchanger and said at least one header block are held together with a ring, one face of the ring contacting at least one of said heat exchanger and header block.

13. The reactor of claim 12, wherein one side of the ring is braced against an outer diameter of said at least one of said heat exchanger and header block and another side of the ring is braced against an inside of the containment vessel.

14. The reactor of claim 12, further comprising springs contacting another face of said ring to enable thermal expansion.

15. The reactor of claim 14, wherein said springs have a temperature rating of less than about 650 degrees and are disposed in a section of the containment vessel capable of accommodating said springs.

* * * * *